(12) United States Patent
Yin

(10) Patent No.: US 10,774,910 B1
(45) Date of Patent: Sep. 15, 2020

(54) HYDROKINETIC TORQUE-COUPLING DEVICE HAVING LOCK-UP CLUTCH WITH DUAL PISTON ASSEMBLY AND SELECTABLE ONE-WAY CLUTCH

(71) Applicant: Valeo Kapec Co., Ltd., Daegu (KR)

(72) Inventor: Xuexian Yin, Auburn Hills, MI (US)

(73) Assignee: Valeo Kapec Co., Ltd., Daegu (KR)

( * ) Notice: Subject to any disclaimer, the term of this patent is extended or adjusted under 35 U.S.C. 154(b) by 0 days.

(21) Appl. No.: 16/408,698

(22) Filed: May 10, 2019

(51) Int. Cl.
| | |
|---|---|
| *F16H 45/02* | (2006.01) |
| *F16D 41/064* | (2006.01) |
| *F16D 41/08* | (2006.01) |
| *F16H 45/00* | (2006.01) |

(52) U.S. Cl.
CPC .......... *F16H 45/02* (2013.01); *F16D 41/064* (2013.01); *F16D 41/086* (2013.01); *F16H 2045/002* (2013.01); *F16H 2045/0221* (2013.01); *F16H 2045/0273* (2013.01); *F16H 2045/0294* (2013.01)

(58) Field of Classification Search
CPC ............... F16H 45/02; F16H 2045/002; F16H 2045/021; F16H 2045/0221; F16H 2045/0273; F16H 2045/0278; F16H 2045/0284; F16H 2045/0294; F16D 41/064; F16D 41/066; F16D 41/067; F16D 41/08; F16D 41/086; F16D 41/088
See application file for complete search history.

(56) References Cited

U.S. PATENT DOCUMENTS

| | | |
|---|---|---|
| 7,464,801 B2 | 12/2008 | Wittkopp |
| 2008/0169165 A1 | 7/2008 | Samie et al. |
| 2015/0323018 A1 | 11/2015 | Hemphill et al. |
| 2017/0326965 A1 | 11/2017 | Lahr et al. |
| 2018/0178778 A1 | 6/2018 | Lahr et al. |

*Primary Examiner* — Jacob S. Scott
(74) *Attorney, Agent, or Firm* — Berenato & White, LLC

(57) ABSTRACT

A hydrokinetic torque-coupling device for a hybrid electric vehicle, comprising a casing rotatable about a rotational axis, a torque converter including an impeller wheel and a turbine wheel, a lockup clutch including a dual piston assembly, and a selectable one-way clutch disposed outside of the casing. The selectable one-way clutch includes an outer race, torque transmitting elements, an inner race drivingly and non-rotatably connectable to the outer race through the torque transmitting elements, and a plurality of actuator members configured to circumferentially displace one of the torque transmitting elements in each pair of the torque transmitting elements. The dual piston assembly includes a main piston and at least one secondary piston having actuator rods. One torque transmitting element of each pair of the torque transmitting elements is moveable by axial movement of the actuator rods of the at least one second lockup piston acting to the actuator members.

24 Claims, 26 Drawing Sheets

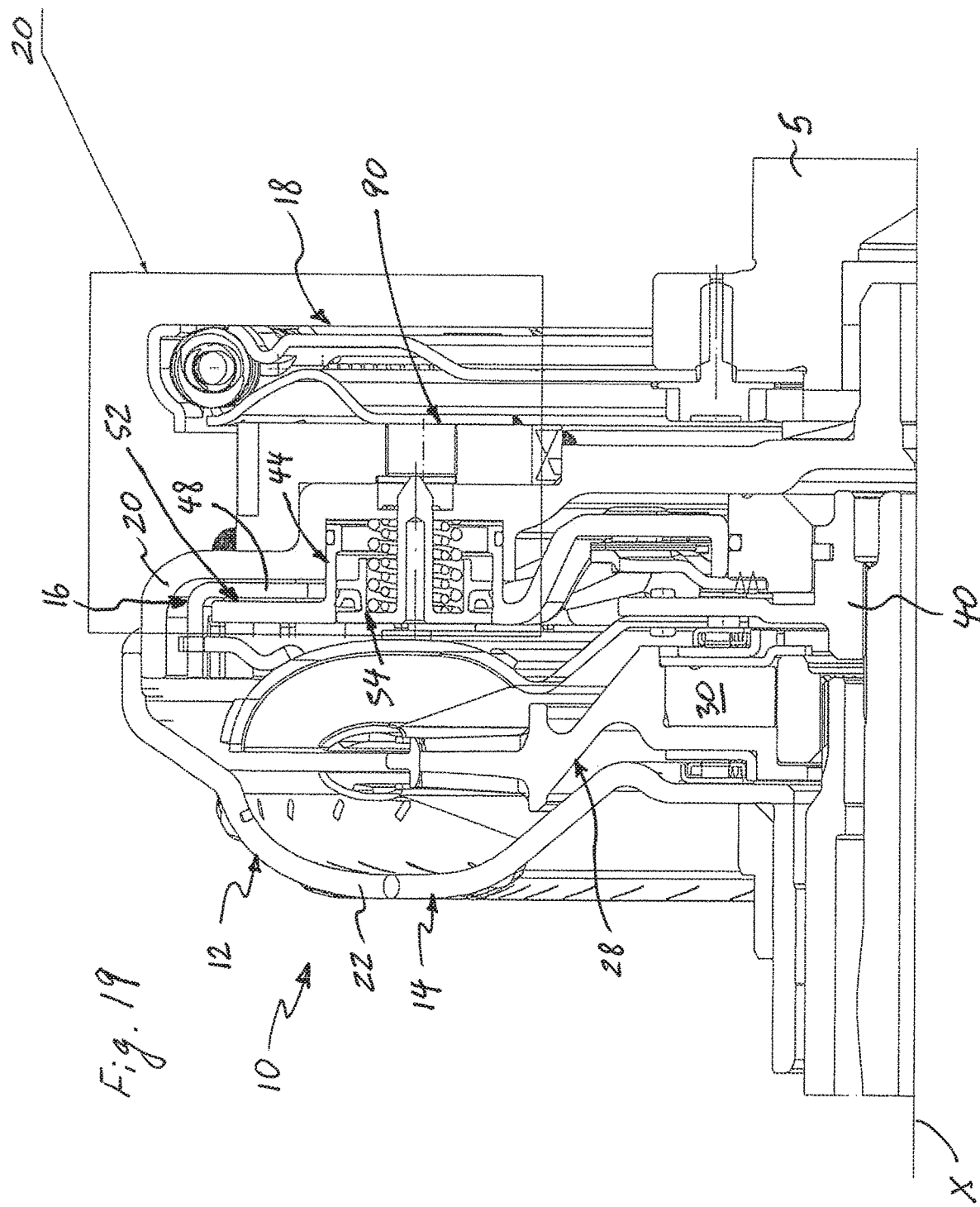

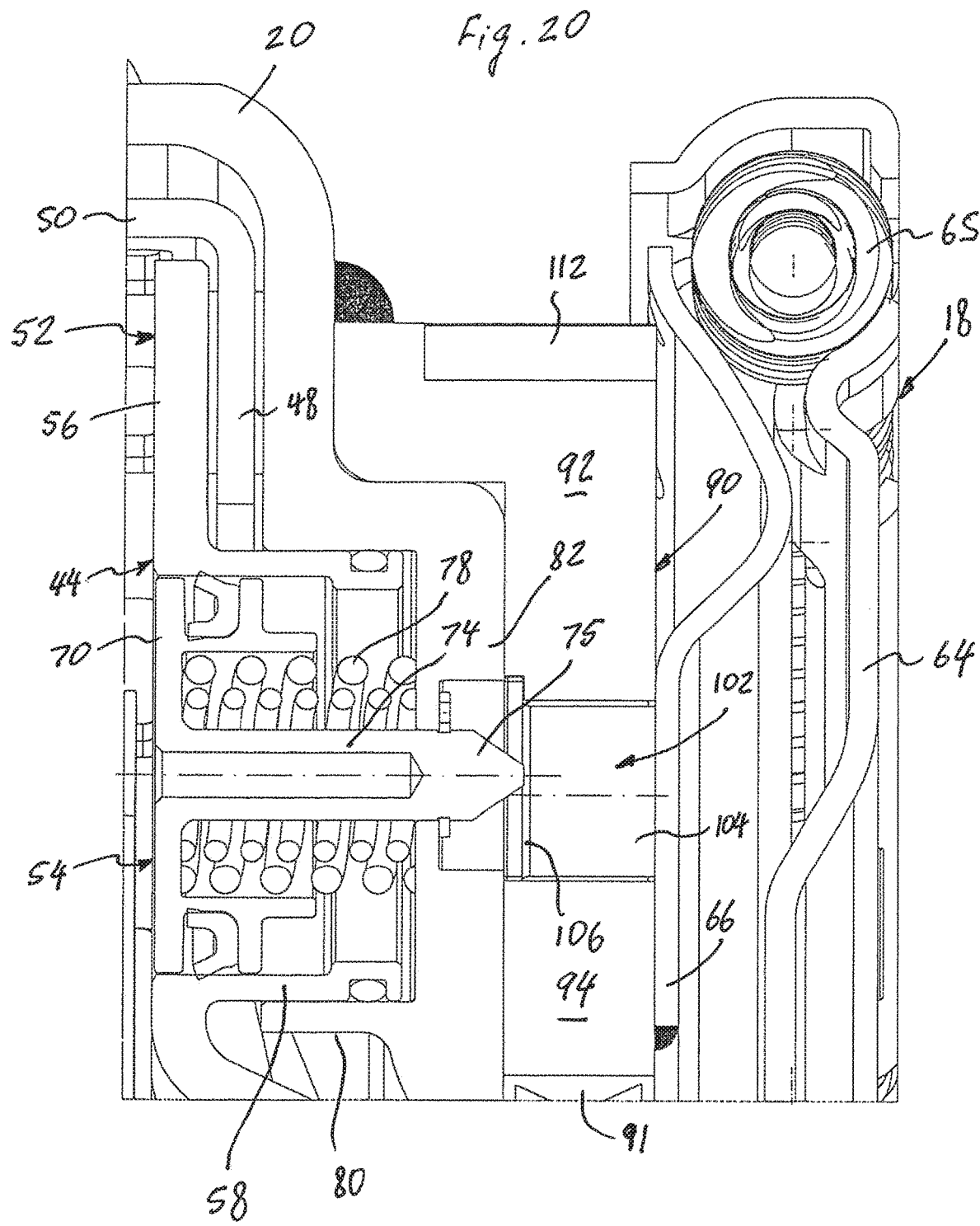

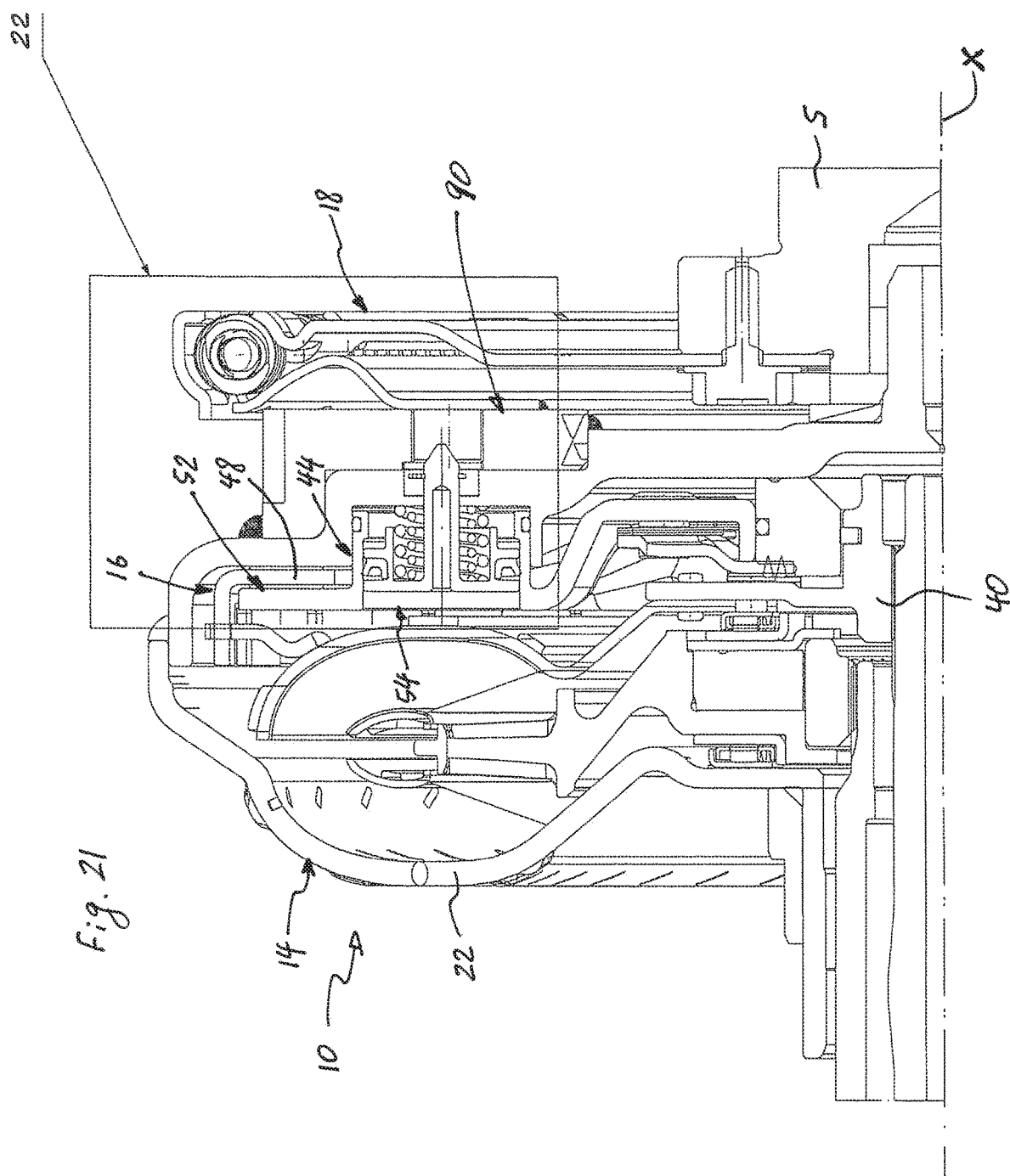

HYDROKINETIC TORQUE-COUPLING DEVICE HAVING LOCK-UP CLUTCH WITH DUAL PISTON ASSEMBLY AND SELECTABLE ONE-WAY CLUTCH

FIELD OF THE INVENTION

This invention generally relates to fluid coupling devices, and more particularly to a hydrokinetic torque-coupling device for a vehicle hybrid powertrain system having a lock-up clutch with a dual piston structure and selectable one-way clutch, and a method of making the same.

BACKGROUND OF THE INVENTION

Known hybrid powertrain systems include an internal combustion engine and an electric motor/generator that are coupled to a vehicle transmission to transfer torque to a driveline for tractive effort. Known electric motor/generators are supplied electric power from energy storage systems, such as electric batteries. Hybrid powertrain systems may operate in various modes to generate and transfer propulsion power to vehicle wheels.

While hybrid powertrain systems, including but not limited to those discussed above, have proven to be acceptable for vehicular driveline applications and conditions, improvements that may enhance their performance and cost are possible.

BRIEF SUMMARY OF THE INVENTION

According to a first aspect of the invention, a hydrokinetic torque-coupling device for a hybrid electric vehicle comprises a casing rotatable about a rotational axis, a torque converter including an impeller wheel and a turbine wheel disposed in the casing coaxially with the impeller wheel, a lockup clutch including a dual piston assembly and being switchable between a hydrodynamic transmission mode, in which the turbine wheel is rotatable relative to the casing, and a lockup mode, in which the turbine wheel is non-rotatably coupled to the casing, and a selectable one-way clutch disposed outside of the casing. The selectable one-way clutch includes an outer race, a plurality of pairs of torque transmitting elements each including first and second torque transmitting elements, an inner race drivingly and non-rotatably connectable to the outer race through the first and second torque transmitting elements, and a plurality of actuator members configured to circumferentially displace the first torque transmitting elements in each of the pairs of the torque transmitting elements. Each of the first and second torque transmitting elements of each of the pairs of the torque transmitting elements is selectively circumferentially moveable relative to at least one of the outer race and the inner race between an engaged position, in which the outer race is non-rotatably coupled to the inner race of the selectable one-way clutch, and a disengaged position, in which the outer race is rotatable relative to the inner race of the selectable one-way clutch. The dual piston assembly includes a main piston and at least one secondary piston mounted to the main piston and axially moveable relative to the main piston and the casing. The main piston of the dual piston assembly is selectively axially moveable relative to the casing and the at least one secondary piston between a lockup position, in which the main piston is non-rotatably coupled to the casing, and a non-lockup position, in which the main piston is rotatable relative to the casing. The at least one secondary piston has a plurality of actuator rods unitary with the at least one secondary piston. The first torque transmitting elements of each of the pairs of torque transmitting elements are selectively circumferentially moveable from the engaged position to the disengaged position by axial movement of the actuator rods of the at least one second lockup piston acting to the actuator members.

According to a second aspect of the invention, a method of operation a hydrokinetic torque-coupling device for a hybrid electric vehicle comprising an internal combustion engine and an electrical machine is disclosed. The hydrokinetic torque-coupling device comprises a casing rotatable about a rotational axis and drivingly coupled to the electrical machine, a torque converter including an impeller wheel and a turbine wheel disposed in the casing coaxially with the impeller wheel, a lockup clutch including a dual piston assembly and being switchable between a hydrodynamic transmission mode, in which the turbine wheel is rotatable relative to the casing, and a lockup mode, in which the turbine wheel is non-rotatably coupled to the casing, and a selectable one-way clutch disposed outside of the casing. The selectable one-way clutch includes an outer race, a plurality of pairs of torque transmitting elements each including first and second torque transmitting elements, an inner race drivingly and non-rotatably connectable to the outer race through the first and second torque transmitting elements, and a plurality of actuator members configured to circumferentially displace the first torque transmitting elements in each of the pairs of the torque transmitting elements. Each of the first and second torque transmitting elements of each of the pairs of the torque transmitting elements is selectively circumferentially moveable relative to at least one of the outer race and the inner race between an engaged position, in which the outer race is non-rotatably coupled to the inner race of the selectable one-way clutch, and a disengaged position, in which the outer race is rotatable relative to the inner race of the selectable one-way clutch. The dual piston assembly includes a main piston and at least one secondary piston mounted to the main piston and axially moveable relative to the main piston and the casing. The main piston of the dual piston assembly is selectively axially moveable relative to the casing and the at least one secondary piston between a lockup position, in which the main piston is non-rotatably coupled to the casing, and a non-lockup position, in which the main piston is rotatable relative to the casing. The at least one secondary piston has a plurality of actuator rods unitary with the at least one secondary piston. The first torque transmitting elements of each of the pairs of the torque transmitting elements is selectively circumferentially moveable from the engaged position to the disengaged position by axial movement of the actuator rods of the at least one second lockup piston acting to the actuator members. The method of operation of the hydrokinetic torque-coupling device the step of selectively controlling axial displacement of the dual lockup piston assembly by regulating hydraulic pressure to the main piston and the at least one secondary piston in order to configure the first torque transmitting elements of the selectable one-way clutch in a desired one of the engaged position and the disengaged position.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

FIG. 19 is a sectional view of the hydrokinetic torque-coupling device in accordance with the exemplary embodiment of the present invention in a second mode of operation;

FIG. 20 is an enlarged view of a fragment of the hydrokinetic torque-coupling device shown in the rectangle "20" of FIG. 19;

FIG. 21 is a sectional view of the hydrokinetic torque-coupling device in accordance with the exemplary embodiment of the present invention in a third mode of operation;

Figure 1:
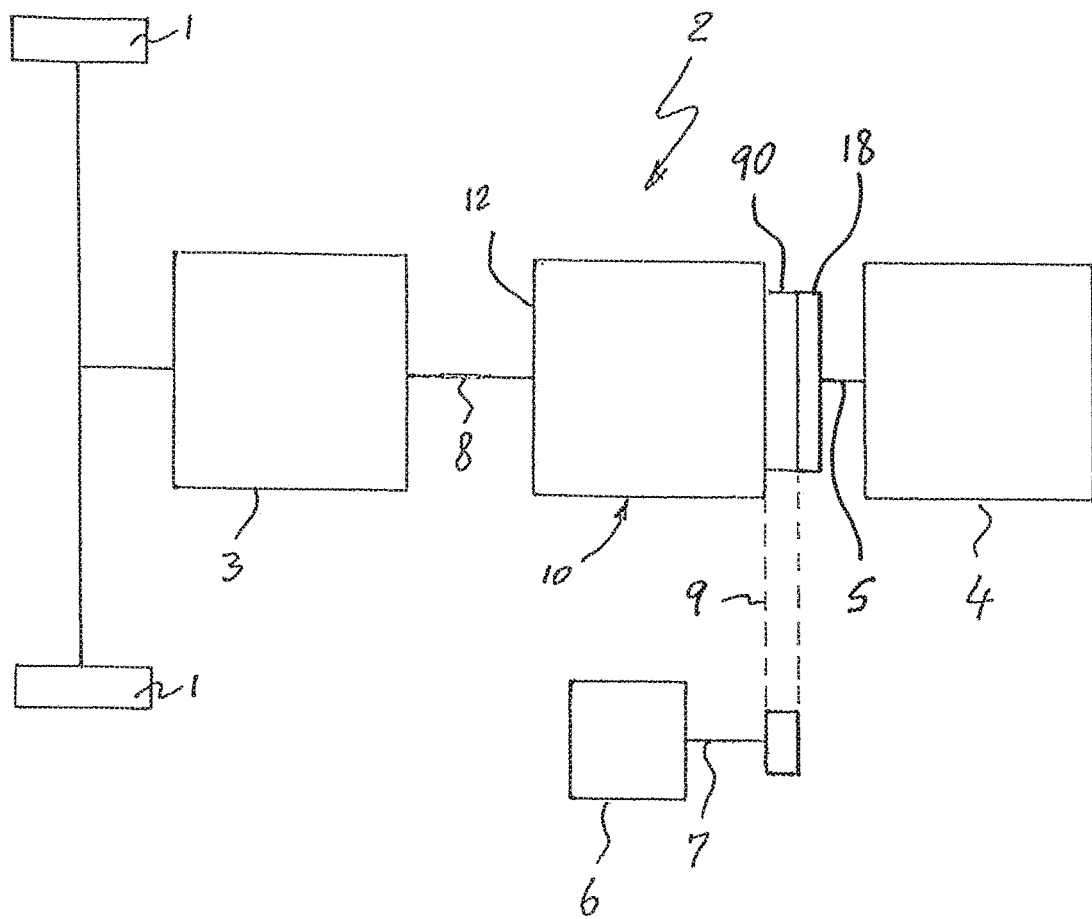
FIG. 1 is a schematic view of a hybrid powertrain system in accordance with the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the words "a" and "an" as used in the claims means "at least one" and the word "two" as used in the claims means "at least two". For the purpose of clarity, some technical material that is known in the related art has not been described in detail in order to avoid unnecessarily obscuring the disclosure.

FIG. 1 shows a schematic view of a hybrid powertrain system 2 of a hybrid motor vehicle in accordance with the present invention. The hybrid powertrain system 2 comprises multiple torque-generating devices, including an internal combustion engine (ICE) 4 and at least one rotary electric machine (such as a motor, generator or motor/generator) 6. The ICE 4 and the electric machine 6 are mechanically coupled via a hydrokinetic torque-coupling device 10 and a transmission 3 to transfer propulsion power to vehicle wheels 1. The hydrokinetic torque-coupling device 10 of the present invention may be employed in any suitable powertrain configuration that includes the internal combustion engine 4 and the electric machine 6 coupled via the hydrokinetic torque-coupling device 10 and the transmission 3. The hybrid powertrain system 2 may be employed in vehicles including, but not limited to, passenger vehicles, light-duty or heavy-duty trucks, utility vehicles, agricultural vehicles, industrial/warehouse vehicles, recreational off-road vehicles, etc.

The hybrid powertrain system 2 is configured so that the ICE 4 and the electric machine 6 are mechanically coupled to the transmission 3 employing the hydrokinetic torque-coupling device 10.

Figure 2:
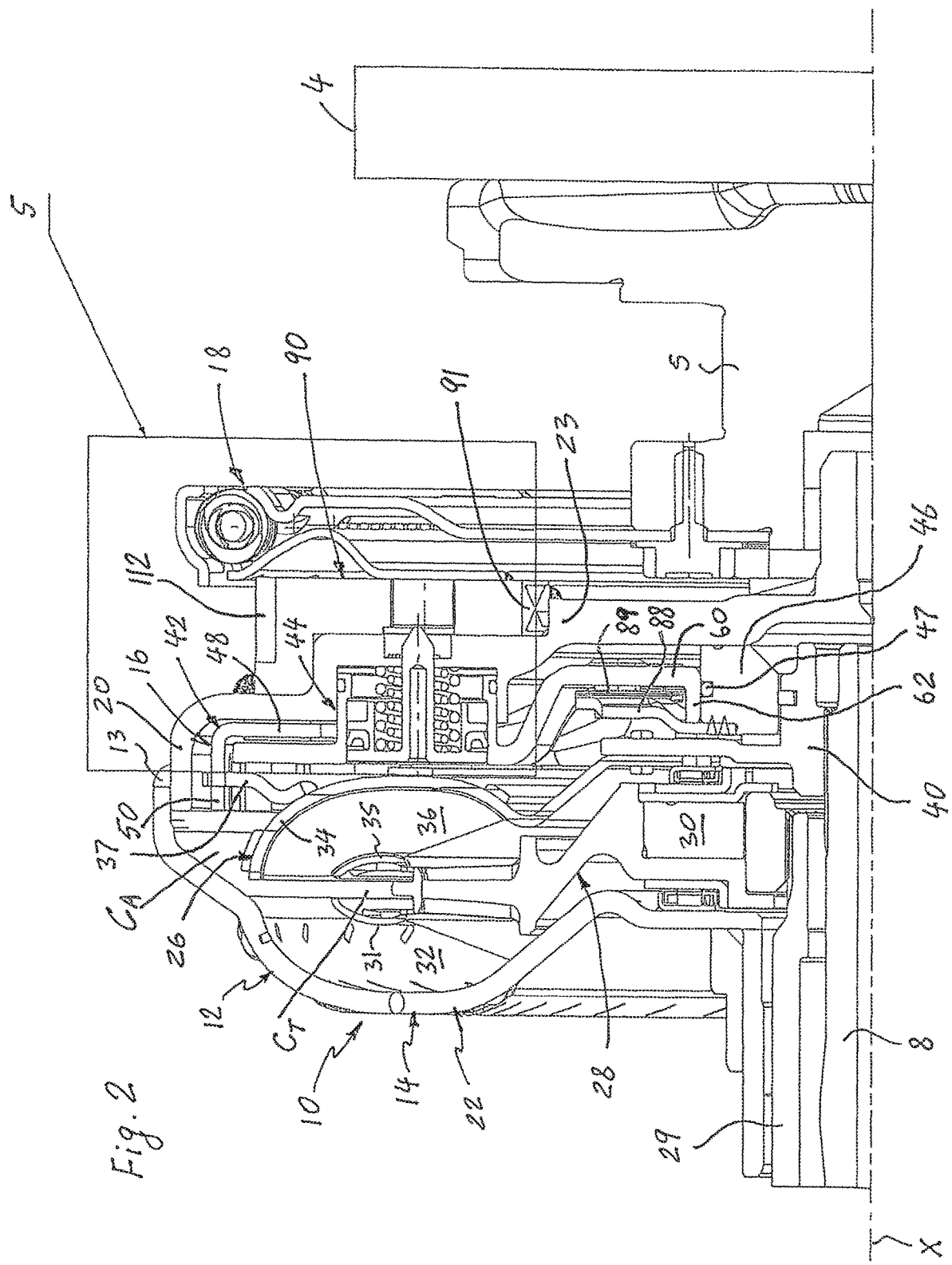
FIG. 2 is a sectional half-view of a hydrokinetic torque-coupling device in accordance with an exemplary embodiment of the present invention in a first mode of operation.

The hydrokinetic torque-coupling device in accordance with an exemplary embodiment of the present invention is generally represented in the accompanying drawings by reference numeral 10, as best shown in FIG. 2. The hydrokinetic torque-coupling device 10 is intended to couple first and/or second driving shafts to a driven shaft 8, for example in the hybrid powertrain system 2 of the hybrid motor vehicle. In this case, the first driving shaft is an output shaft (such as a crankshaft) 5 of the ICE 4 of the hybrid motor vehicle, and the second driving shaft is an output shaft 7 of the rotary electric machine 6, as best shown in FIG. 1. The driven shaft 8 is an input shaft of a transmission (or gearbox) 3 of the hybrid motor vehicle, as shown in FIG. 1. Thus, the hydrokinetic torque-coupling device 10 is intended to couple the ICE 4 of the hybrid motor vehicle and/or the rotary electric machine 6 to the driven shaft 8.

The hydrokinetic torque-coupling device 10 includes a sealed casing 12 filled with a fluid, such as oil or transmission fluid, and rotatable about a rotational axis X, a hydrokinetic torque converter 14, a lock-up clutch 16, an elastic damping device (or torsional vibration damper) 18 and a selectable one-way clutch (SOWC) 90. As best shown in FIG. 2, the lock-up clutch 16 is disposed in the casing 12, while the torsional vibration damper 18 and the SOWC 90 are disposed outside of the casing 12.

The sealed casing 12, the torque converter 14, the lock-up clutch 16, the torsional vibration damper 18 and the SOWC 90 are all rotatable about the rotational axis X. As is known in the art, the torque-coupling device 10 is generally symmetrical about the rotational axis X. Hereinafter the axial and radial orientations are considered with respect to the rotational axis X of the torque-coupling device 10. The relative terms such as "axially," "radially," and "circumferentially" are with respect to orientations parallel to, perpendicular to, and circularly around the rotational axis X, respectively.

The sealed casing 12 according to the exemplary embodiment as illustrated in FIG. 2 includes a first shell (or cover shell) 20, and a second shell (or impeller shell) 22 disposed coaxially with and axially opposite to the first shell 20. The first and second shells 20, 22 are non-movably (i.e., fixedly) interconnected and sealed together about their outer peripheries, such as by weld 13. Each of the first and second shells 20, 22 are integral or one-piece and may be made, for example, by press-forming one-piece metal sheets.

The first shell 20 is selectively drivingly connectable to the driving shaft, typically to the output shaft 5 of the ICE 4, through the torsional vibration damper 18 and the SOWC 90. Specifically, in the illustrated embodiment of FIG. 2, the casing 12 is selectively rotatably driven by the ICE 4 and is selectively drivingly coupled to the torsional vibration damper 18 and the driving shaft 5 through the SOWC 90.

Furthermore, the casing 12 is drivingly (non-rotatably) connected to the output shaft 7 of the rotary electric machine 6 through a ring gear (or a sprocket) formed integrally with or mounted to the SOWC 90, which is non-movably (i.e., fixedly) connected to the casing 12 (such as by welding or other appropriate means), and a continuous belt 9 (or a pinion gear), so that the casing 12 turns at the same speed at which the rotary electric machine 6 operates for transmitting torque.

The torque converter 14 includes an impeller wheel (sometimes referred to as the pump, impeller assembly or impeller) 24, a turbine wheel (sometimes referred to as the turbine assembly or turbine) 26, and a stator (sometimes referred to as the reactor) 28 interposed axially between the impeller wheel 24 and the turbine wheel 26, as best shown in FIG. 2. The impeller wheel 24, the turbine wheel 26, and the stator 28 are coaxially aligned with one another and the rotational axis X. The impeller wheel 24, the turbine wheel 26, and the stator 28 collectively form a torus. The impeller wheel 24 and the turbine wheel 26 may be fluidly coupled to one another in operation as known in the art. In other words, the turbine wheel 26 is hydro-dynamically drivable by the impeller wheel 24.

The impeller wheel 24 includes the impeller shell 22, an annular impeller core ring 31, and a plurality of impeller blades 32 fixedly (i.e., non-moveably) attached, such as by brazing, to the impeller shell 22 and the impeller core ring 31. The impeller shell 22 is an integral (or unitary) component, e.g., made of a single part or separate components fixedly connected together.

Figure 3:
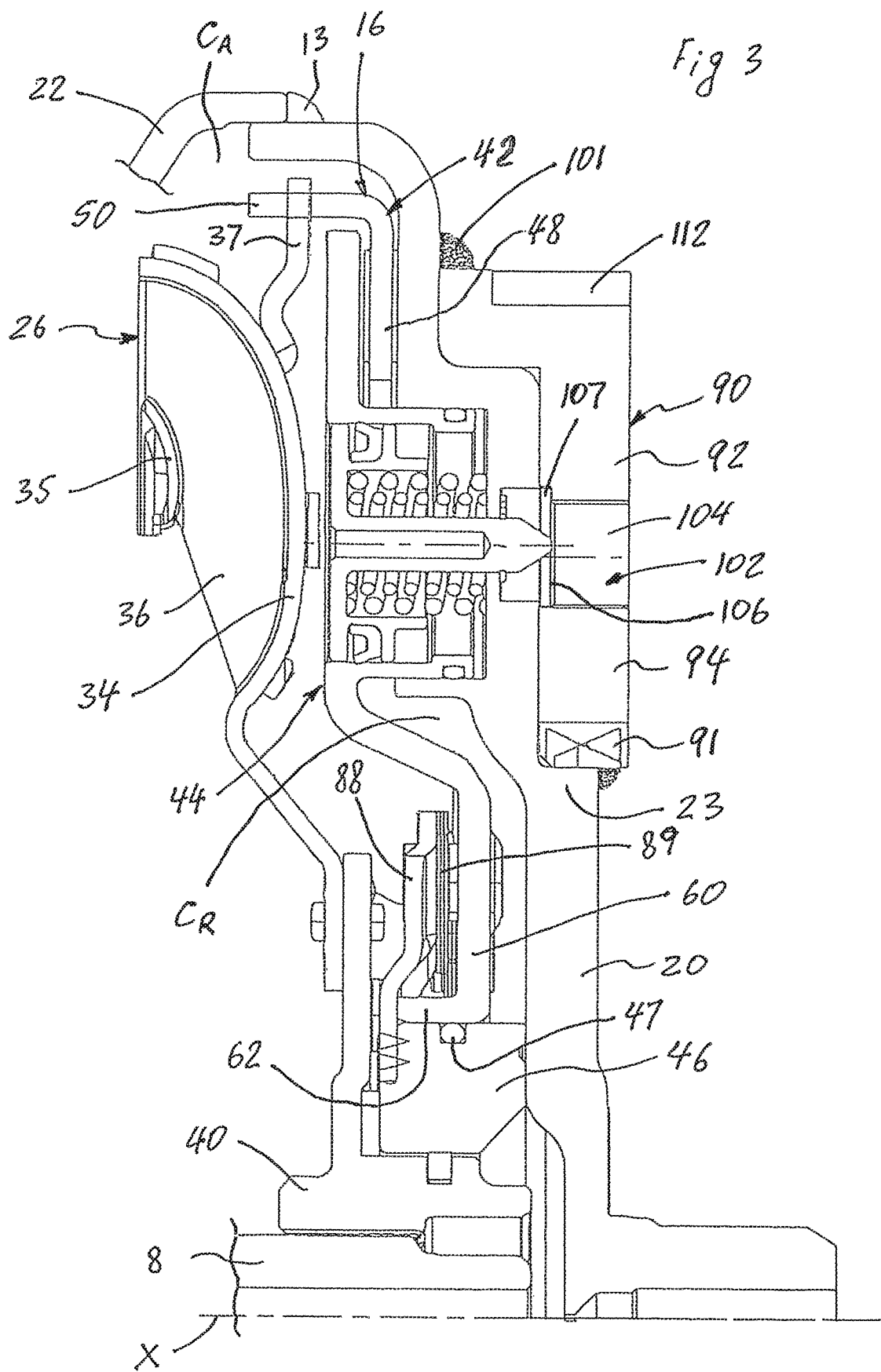
FIG. 3 is an enlarged view of a fragment of the hydrokinetic torque-coupling device of FIG. 2 showing a turbine wheel, a lock-up clutch and a selectable one-way clutch (SOWC)

The turbine wheel 26, as best shown in FIGS. 2 and 3, includes an annular, semi-toroidal (or concave) turbine shell 34 rotatable about the rotational axis X, an annular turbine core ring 35, and a plurality of turbine blades 36 fixedly (i.e., non-moveably) attached, such as by brazing, to the turbine shell 34 and the turbine core ring 35. The turbine shell 34, the turbine core ring 35 and the turbine blades 36 are conventionally formed by stamping from steel blanks. The impeller shell 22 and the turbine shell 34 collectively define a toroidal inner chamber (or torus chamber) CT therebetween. The stator 28 is positioned between the impeller wheel 24 and the turbine wheel 26 to redirect fluid from the turbine wheel 26 back to the impeller wheel 24 in an efficient manner. The stator 28 is typically mounted on a one-way (or overrunning) clutch 30 to prevent the stator 28 from counter-rotating.

The turbine wheel 26 is non-rotatably secured to a turbine (or output) hub 40 by appropriate means, such as by rivets, threaded fasteners or welding. The turbine hub 40 is non-rotatably splined to the driven shaft 8. The turbine hub 40 is rotatable about the rotational axis X and is coaxial with the driven shaft 8 so as to center the turbine wheel 26 on the driven shaft 8. Conventionally, the turbine blades 36 of the turbine wheel 26 interact, in a known manner, with the impeller blades 32 of the impeller wheel 24. The stator 28 is coupled in rotation to a stationary stator shaft 29 through the one-way (or overrunning) clutch 30.

At low turbine shaft speeds, the impeller wheel 24 causes hydraulic fluid to flow from the impeller wheel 24 to the turbine wheel 26, and to flow back to the impeller wheel 24 through the stator 28, thereby providing a first power flow path. The stator 28 is held against rotation by the one-way clutch 30, such that it can redirect the fluid flow and provide a reaction torque for torque multiplication. The one-way clutch 30 permits rotation of the stator 28 in one direction only. In other words, the stator 28 is typically mounted on the one-way clutch 30 to prevent the stator 28 from counter-rotation.

Figure 4:
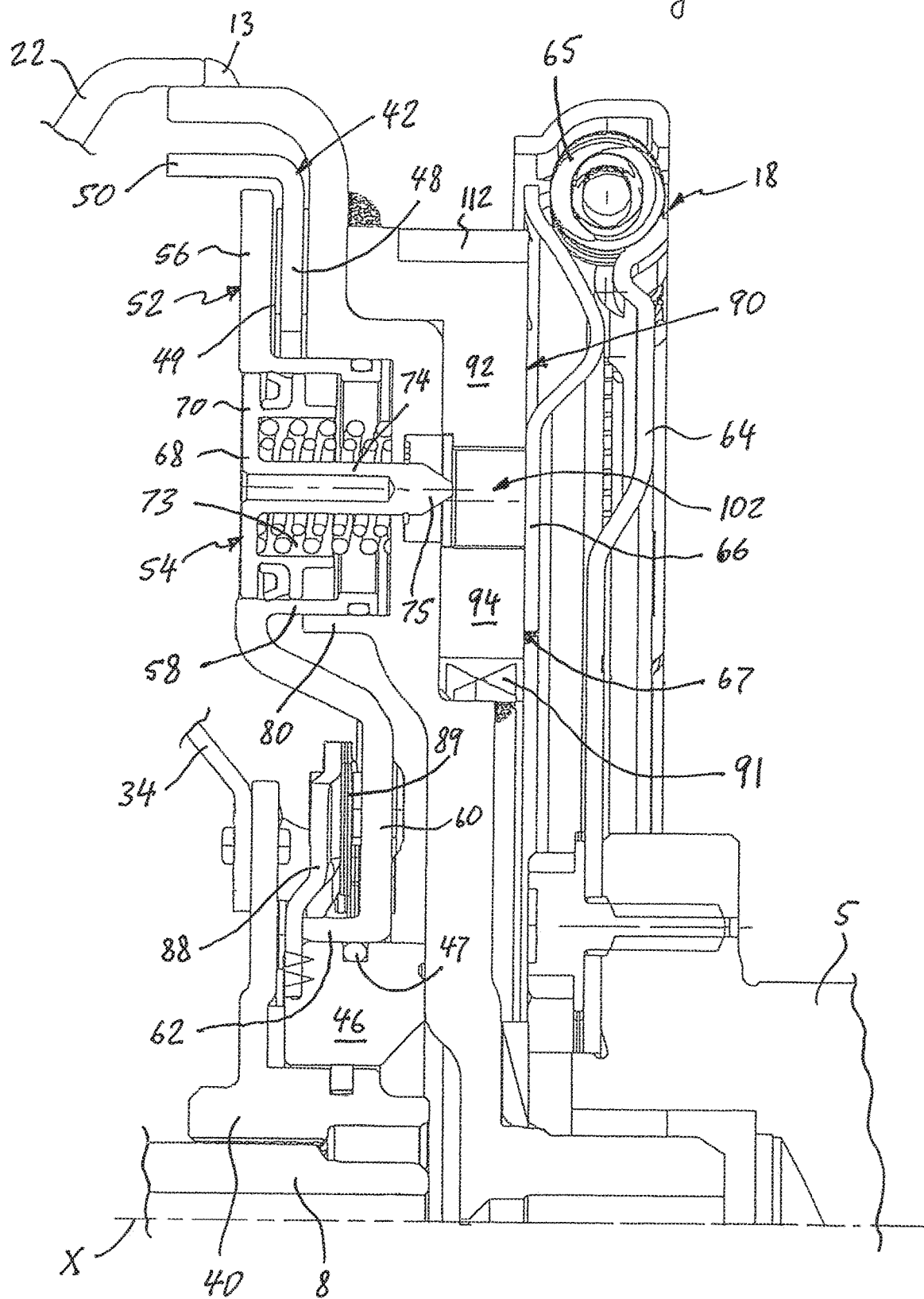
FIG. 4 is an enlarged view of a fragment of the hydrokinetic torque-coupling device of FIG. 2 showing the lock-up clutch, the selectable one-way clutch (SOWC) and a torsional vibration damper.
Figure 5:
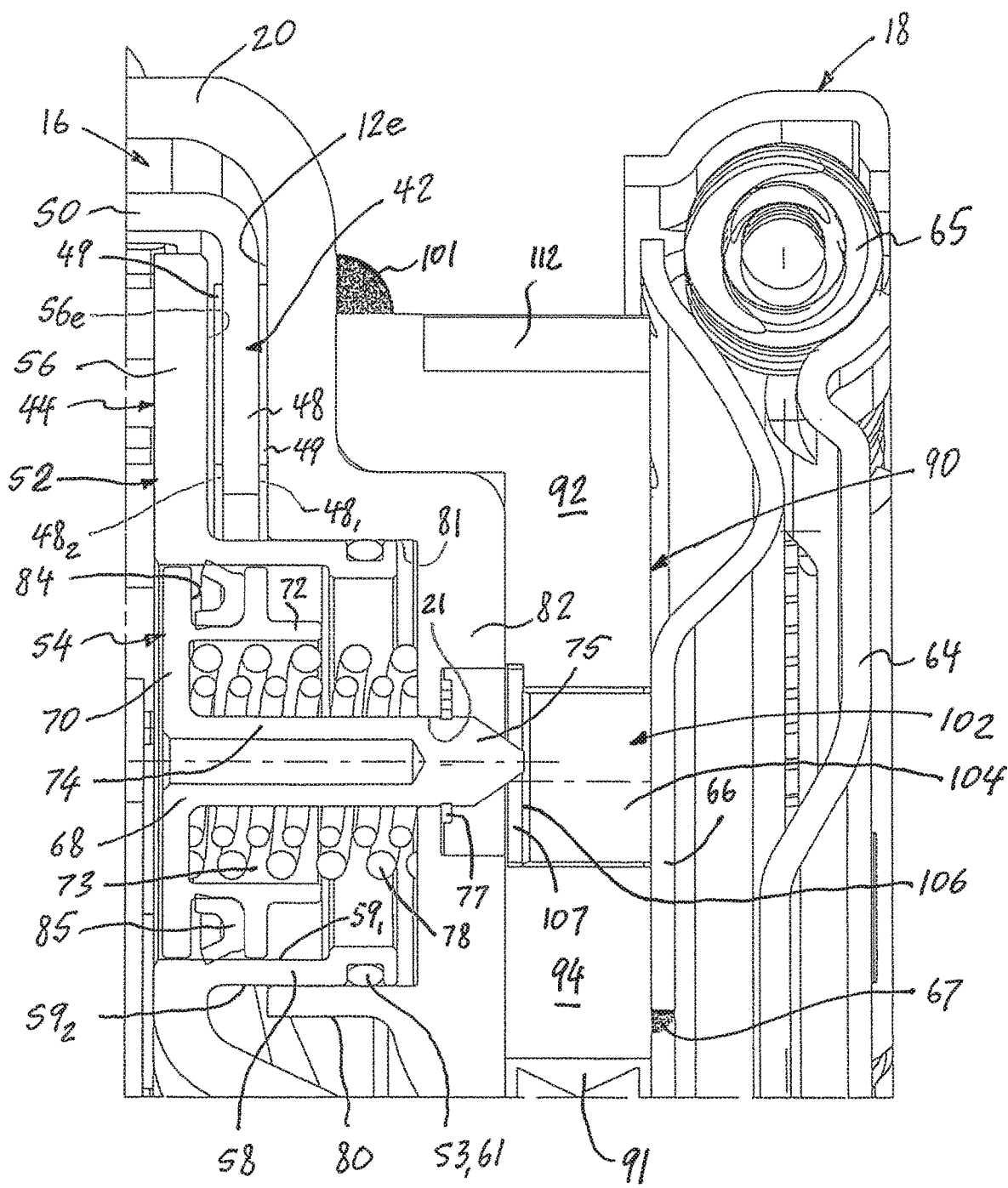
FIG. 5 is an enlarged view of a fragment of the hydrokinetic torque-coupling device shown in the rectangle "5" of FIG. 2.

The lock-up clutch 16 of the torque-coupling device 10 includes a friction ring 42, and a dual piston assembly 44, both axially movable to and from the cover shell 20. The friction ring 42 is axially moveable relative to the casing 12 along the rotational axis X to and from a locking (or inner engagement) surface 12e defined on the cover shell 20 of the casing 12, as best shown in FIGS. 4 and 5. The friction ring 42 is configured to selectively frictionally engage the locking surface 12e of the cover shell 20 of the casing 12. The friction ring 42 is disposed axially between the dual piston assembly 44 and the cover shell 20.

The dual piston assembly 44 is mounted to a cover hub 46 so as to be rotatable relative thereto. Moreover, the dual piston assembly 44 is axially moveable along the cover hub 46. The cover hub 46 is non-moveably attached to the cover shell 20 by appropriate means, such as by welding. In turn, the cover hub 46 is slidingly mounted to the turbine hub 40 so as to be rotatably moveable relative to the turbine hub 40.

The sealed casing 12 and the dual piston assembly 44 collectively define a hydraulically sealed apply chamber $C_A$ between the impeller shell 22 and the dual piston assembly 44, and a hydraulically sealed release chamber $C_R$ between the cover shell 20, the dual piston assembly 44 and the cover hub 46. It is known to those skilled in the art that hydrokinetic torque coupling devices typically include a fluid pump and a control mechanism controlling and regulating hydraulic pressure of the hydrokinetic torque coupling device. The control mechanism regulates the pressure in the apply chamber $C_A$ and in the release chamber $C_R$ (i.e., on the axially opposite sides of a lockup piston) through operation of a valve system to selectively position a lockup piston in a desired position associated with an intended one of the operating modes.

The friction ring 42 includes a generally radially orientated annular friction portion 48, as best shown in FIGS. 4 and 5, and one or more driving tabs (or abutment elements) 50 extending axially outwardly from the friction portion 48 of the friction ring 42. Moreover, the driving tabs 50 are equiangularly and equidistantly spaced from each other. The friction ring 42 with the friction portion 48 and the driving tabs 50 is an integral (or unitary) part, e.g., made of a single or unitary component, but may be separate components fixedly connected together. Preferably, the driving tabs 50 are integrally press-formed on the friction ring 42. The friction ring 42 is drivingly engaged with the turbine wheel 26 through the driving tabs 50 and turbine tabs 37 fixed to an outer surface of the turbine shell 34 by appropriate means, such as by welding. In other words, the driving tabs 50 drivingly engage the turbine tabs 37 so that the friction ring 42 is non-rotatably coupled to the turbine wheel 26 while being axially moveable along the rotational axis X relative to the turbine shell 34 so as to selectively engage the friction ring 42 against the locking surface 12e of the casing 12.

The annular friction portion 48 of the friction ring 42 has axially opposite first and second friction faces $48_1$ and $48_2$, respectively, as best shown in FIG. 5. The first friction face $48_1$ of the friction ring 42 (defining an engagement surface of the friction ring 42) faces the locking surface 12e of the cover shell 20 of the casing 12. An annular friction liner 49 is attached to each of the first and second friction faces $48_1$ and $48_2$ of the annular friction portion 48 of the friction ring 42, such as by adhesive bonding, as best shown in FIG. 5.

The dual piston assembly 44 is mounted to a cover hub 46 so as to be rotatable relative thereto. Moreover, the dual piston assembly 44 is axially moveable along the cover hub 46. The dual piston assembly 44 includes an annular main (or first) piston 52, as best shown in FIGS. 4 and 5, axially movable to and from the cover shell 20, and at least one annular secondary (or second) piston 54 mounted to the main piston 52 and axially moveable relative to the main piston 52. According to the exemplary embodiment of the present invention, the dual piston assembly 44 includes a plurality of annular secondary pistons 54 spaced circumferentially equidistantly (or equiangularly) from one another around the rotational axis X. The friction portion 48 of the friction ring 42 is disposed axially between the main piston 52 and the locking surface 12e of the cover shell 20.

Figure 7:
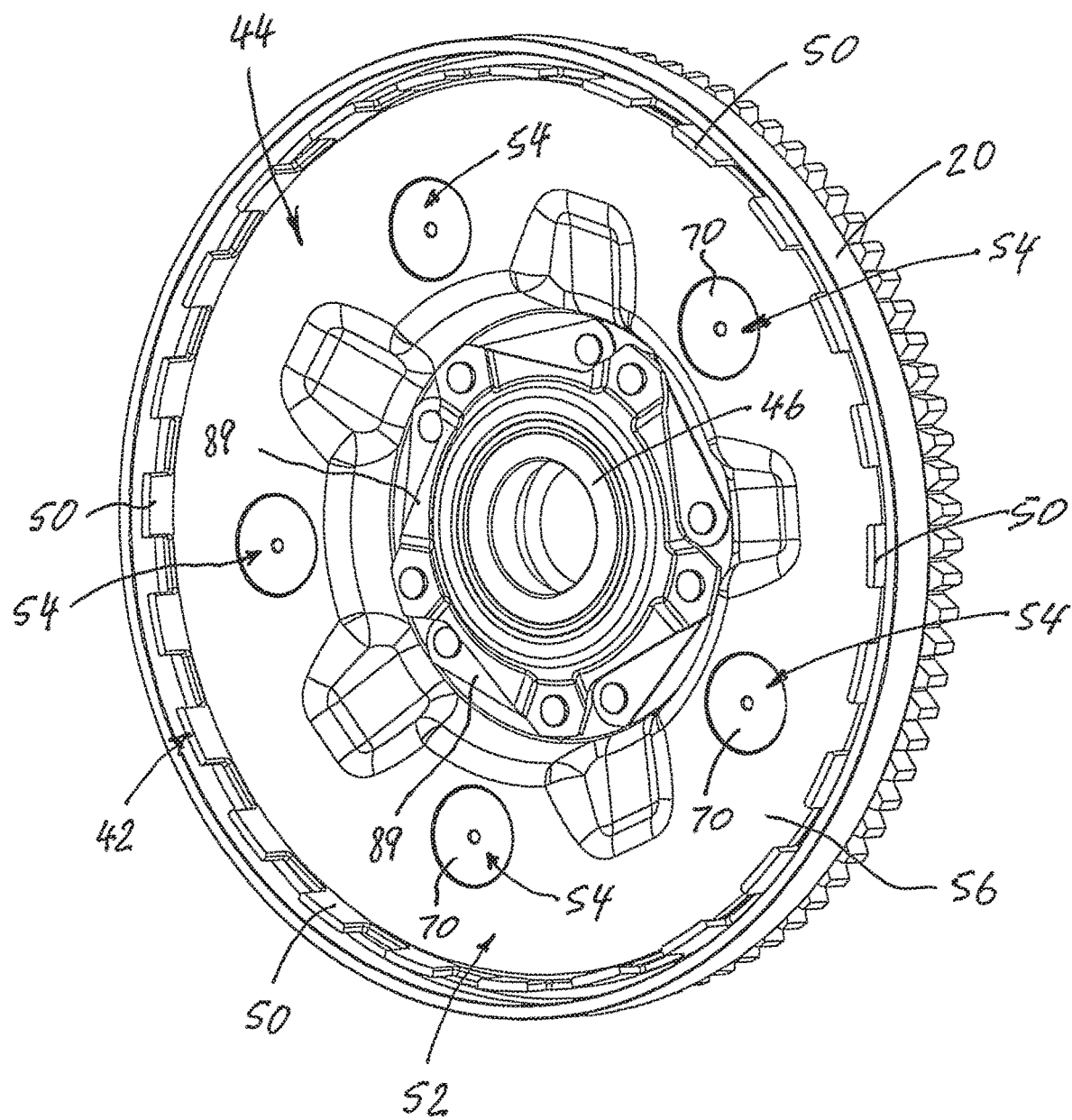
FIG. 7 is a perspective view of the dual piston assembly mounted to the cover shell in accordance with the exemplary embodiment of the present invention.
Figure 8:
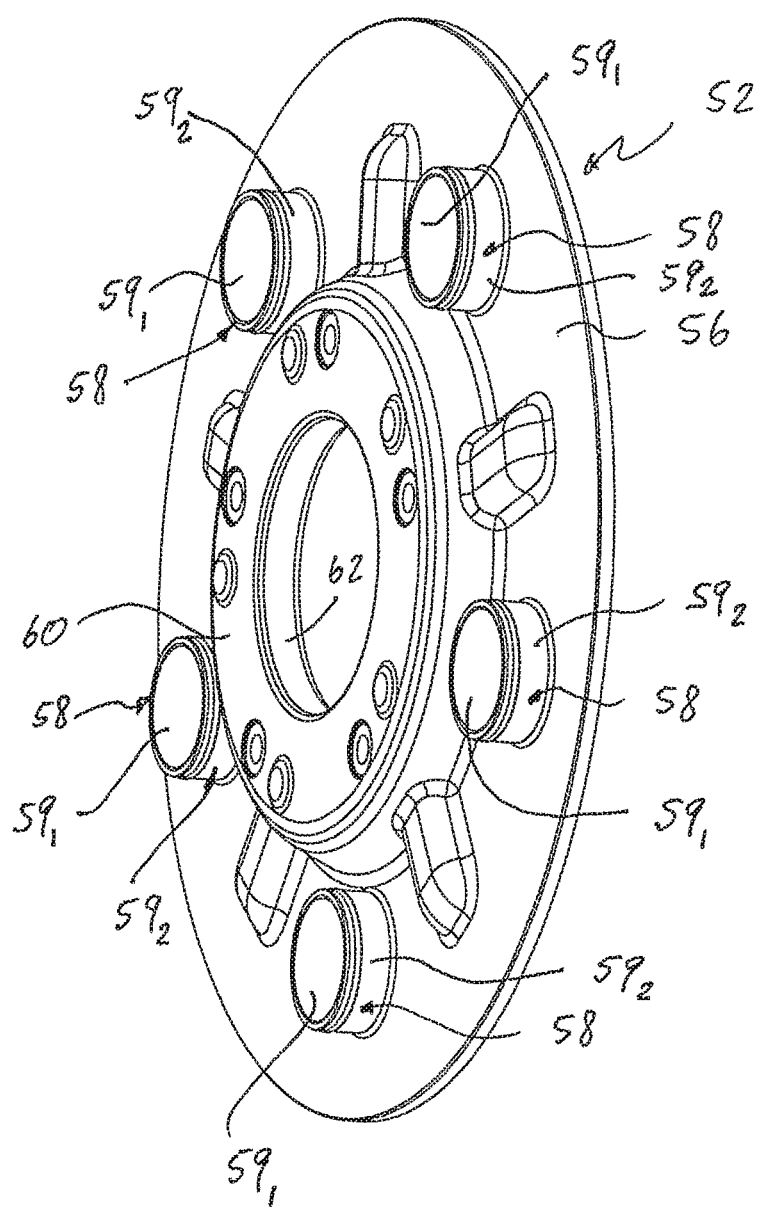
FIG. 8 is a perspective view of a main piston of the dual piston assembly in accordance with the exemplary embodiment of the present invention.

The main piston 52 includes a radially oriented annular piston body 56, at least one axially protruding boss 58, and an annular hub portion 60 having a cylindrical flange 62 that is proximate the rotational axis X relative to the annular piston body 56 of the main piston 52. The cylindrical flange 62 of the hub portion 60 of the main piston 52 extends axially at a radially inner peripheral end of the hub portion 60 toward the turbine wheel 26. According to the exemplary embodiment of the present invention, the main piston 52 includes a plurality of the axially protruding bosses 58 spaced circumferentially equidistantly (or equiangularly) from one another around the rotational axis X, as best shown in FIGS. 6-8.

Figure 6:
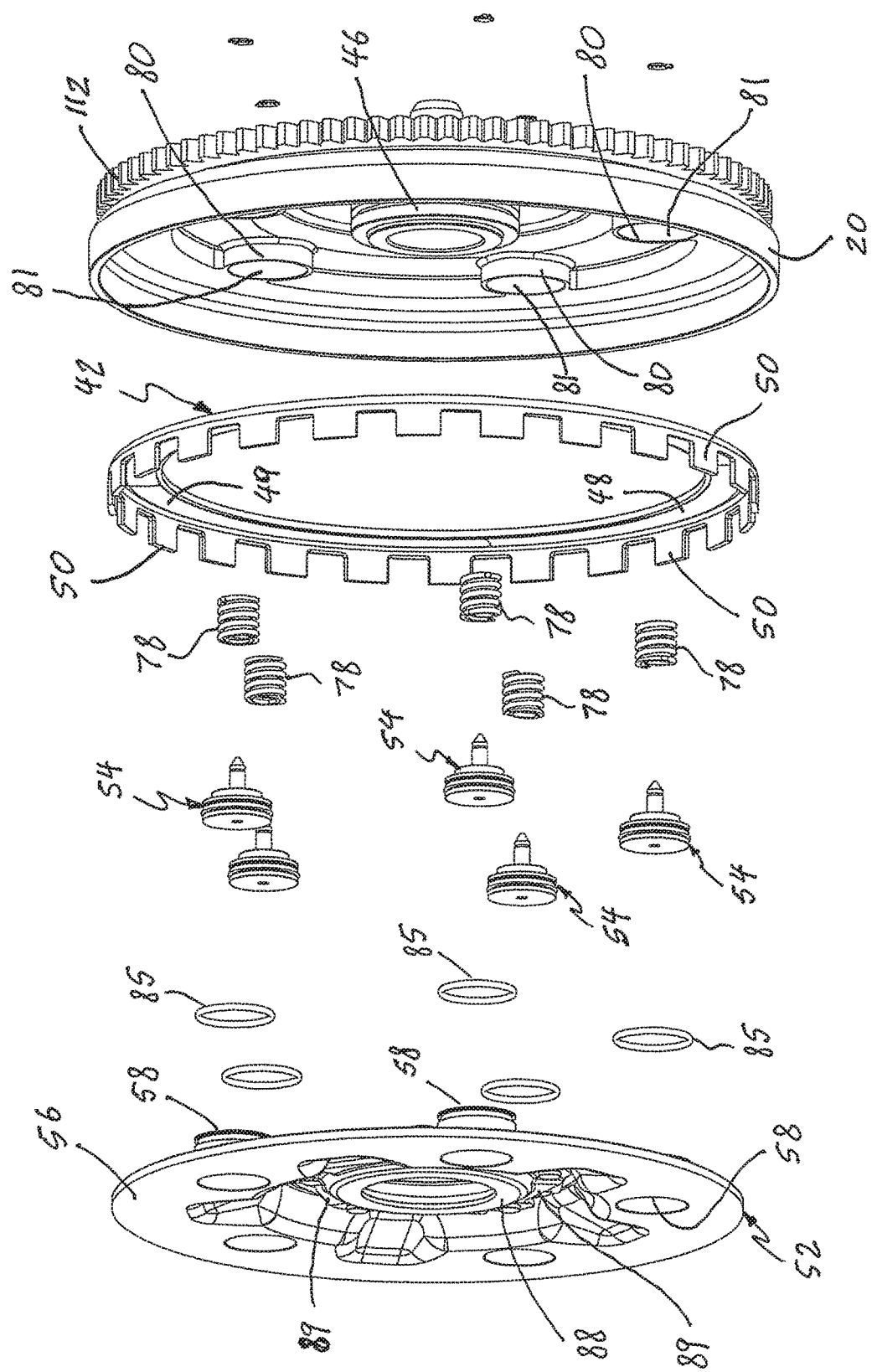
FIG. 6 is an exploded assembly view of the lock-up clutch with a dual piston assembly and a cover shell in accordance with the exemplary embodiment of the present invention.

The cover shell 20 of the casing 12 includes at least one axially protruding piston cup 80 formed integrally with the cover shell 20 of the casing 12, as best shown in FIGS. 2-6. According to the exemplary embodiment of the present invention, the cover shell 20 of the casing 12 includes a plurality of the axially protruding piston cups 80 spaced circumferentially equidistantly (or equiangularly) from one another around the rotational axis X, as best shown in FIG. 6. The piston cups 80 axially protrude from the cover shell 20 toward the secondary pistons 54. As further shown in FIGS. 5 and 6, each of the piston cups 80 has a cylindrical inner surface 81 extending axially parallel to the rotational axis X. The cylindrical inner surface 81 of each of the piston cups 80 corresponds to and is configured for receiving one of the bosses 58, as best shown in FIGS. 2-5. The cover shell 20 of the casing 12 with the piston cups 80 is an integral (or unitary) component, e.g., made of a single part, for example, by press-forming one-piece metal sheets, or separate components fixedly connected together.

Each of the bosses 58 axially protrudes toward the cover shell 20 and into one of the axially protruding piston cups 80 of the cover shell 20. As further shown in FIG. 5, each of the bosses 58 has a cylindrical inner surface $59_1$ and a cylindrical outer surface $59_2$ both extending axially parallel to the rotational axis X. The cylindrical inner surface $59_1$ of each of the bosses 58 correspond to and are configured for receiving one of the secondary pistons 54, as best shown in FIG. 5. The cylindrical outer surface $59_2$ of each of the bosses 58 corresponds to and is configured for being received into one of the axially protruding piston cups 80 of the cover shell 20, as best shown in FIG. 5. The main piston 52 with the annular body 56 and the bosses 58 is an integral (or unitary) component, e.g., made of a single part, for example, by press-forming one-piece metal sheets, or includes separate components fixedly connected together.

As best shown in FIGS. 2-5, the bosses 58 of the main piston 52 are disposed radially below the friction portion 48 of the friction ring 42. The main piston 52 is slidingly mounted to and axially moveable relative to the cover hub 46. A radially outer surface of the cover hub 46 includes an annular slot (or seal groove) for receiving a sealing member, such as an O-ring 47, as best shown in FIGS. 2-4. The sealing member (e.g., O-ring) 47 creates a seal at the interface of the main piston 52 and the cover hub 46. As discussed in further detail below, the main piston 52 is axially movably relative to the cover hub 46 along this interface. The main piston 52 is non-rotatably coupled to the cover hub 46, such as by means of a set of elastic (or flexible) tongues 89, which are arranged substantially on one circumference, and which are oriented tangentially between the cover hub 46 and the main piston 52, while permitting axial displacement of the main piston 52 relative to the cover hub 46. Specifically, as best shown in FIGS. 2-4 and 7, one free end of each of the axially flexible tongues 89 is secured to the annular hub portion 60 of the main piston 52, while an opposite free end of each of the elastic tongues 89 is secured to a strap plate 88, which, in turn, is fixed to the cover hub 46 by appropriate means, such as by welding. The axially flexible tongues 89 are configured to transmit torque between the main piston 52 and the cover hub 46, while allowing axial displacement of the main piston 52 relative to the cover hub 46. In other words, the elastic tongues 89 are configured to be deformed elastically in the axial direction to enable relative movement of the main piston 52 relative to the cover hub 46. The resilient tongues 89 bias the main piston 52 away from the locking surface 12e of the cover shell 20.

The main piston 52 is axially moveable relative to the cover shell 20 between a lockup position and a non-lockup position of the lockup clutch 16. In the lockup position of the lockup clutch 16, the main piston 52 non-rotatably frictionally engages the locking surface 12e of the cover shell 20 of the casing 12. In the non-lockup position of the lockup clutch 16, best shown in FIG. 5, the main piston 52 is axially spaced from the locking surface 12e of the cover shell 20 of the casing 12 and does not frictionally engage the cover shell 20 of the casing 12. In other words, in the lockup position of the lockup clutch 16, the main piston 52 is non-rotatably coupled to the casing 12 so as to non-rotatably couple the casing 12 to the turbine hub 40 through the turbine shell 34, while in the non-lockup position of the lockup clutch 16, the casing 12 is rotatably coupled to the turbine hub 40 through the torque converter 14. Moreover, the strap plate 88 limits axial movement of the main piston 52 in the direction away from the locking surface 12e of the cover shell 20, i.e., toward the non-lockup position of the lockup clutch 16, as best shown in FIGS. 2-4.

Figure 9:
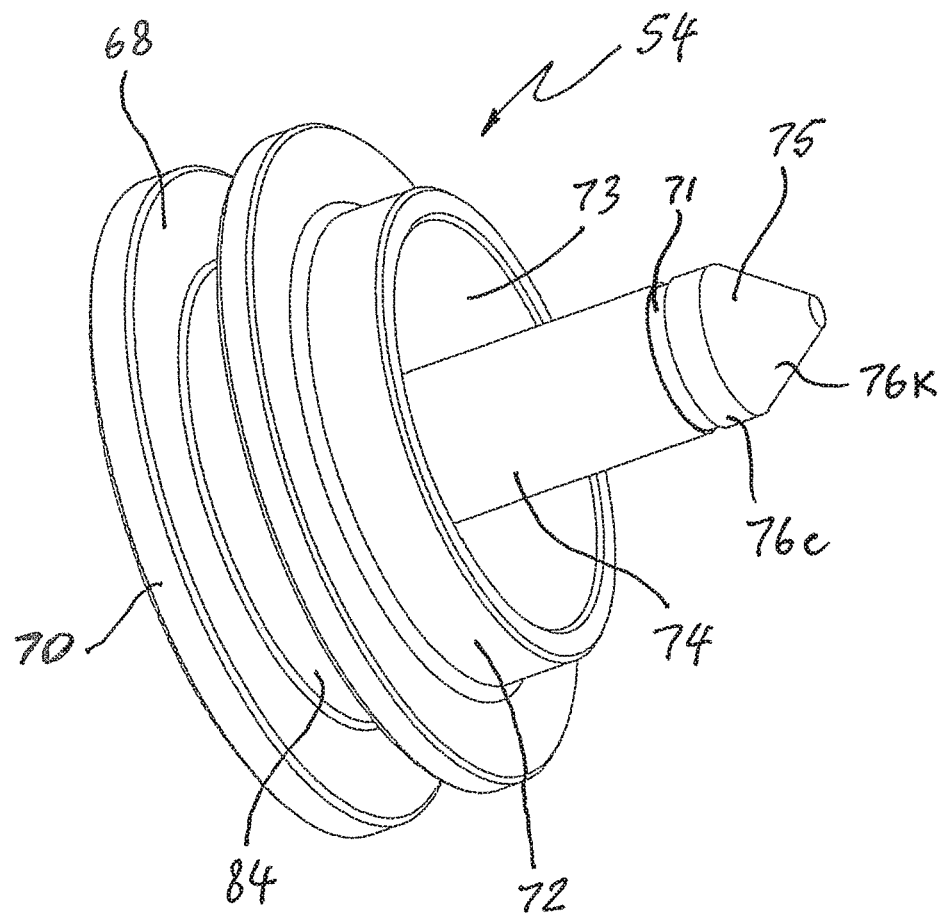
FIG. 9 is a perspective view of a secondary pistons of the dual piston assembly in accordance with the exemplary embodiment of the present invention.

Further according to the exemplary embodiment of the present invention, the secondary pistons 54 are preferably identical. Each of the secondary pistons 54 includes a cylindrical hollow body 68 having a head member 70, a cylindrical skirt 72 defining a hollow chamber 73 within the secondary piston 54, and a piston (or actuator) rod 74 axially extending from the head member 70 through the main piston 52, as best shown in FIGS. 4, 5 and 9. The cylindrical hollow body 68 is formed unitarily with the head member 70, the cylindrical skirt 72 and the actuator rod 74, as best shown in FIG. 5. Each of the secondary pistons 54 is axially slidably mounted within an associated one of the bosses 58 of the main piston 52, while each of the bosses 58 of the main piston 52 is axially slidably mounted within an associated one of the cylindrical piston cups 80 of the cover shell 20 of the casing 12, as best shown in FIG. 2-5. The piston rod 74 of each of the secondary pistons 54 axially extends through a hole 21 extending through each of the piston cups 80 of the cover shell 20, as best shown in FIG. 5. The secondary piston 54, with the cylindrical hollow body 68 and the piston rod 74, is an integral (or unitary) component, e.g., made of a single part, for example, by casting or machining, or includes separate components fixedly connected together.

The cylindrical skirt 72 of the cylindrical hollow body 68 of each of the secondary pistons 54 has an annular groove 84 formed in the cylindrical skirt 72 of the hollow body 68 of each of the secondary pistons 54, for example, by machining or casting. An annular first piston sealing member 85 is disposed in the annular groove 84. Each of the secondary pistons 54 is sealed within one of the bosses 58 of the main piston 52 by the first piston sealing member 85. According to the exemplary embodiment of the present invention, the secondary pistons 54 are axially reciprocatingly and sealingly moveable relative to both the main piston 52 and the cover shell 20 of the casing 12. The first piston sealing member 85, mounted to a radially outer peripheral surface of each of the secondary pistons 54, creates a seal at the interface of the main piston 52 and each of the secondary pistons 54. Similarly, the cylindrical outer surface $59_2$ of each of the bosses 58 is formed with an annular groove 53 formed in the boss 58 of each of the main piston 152, for example, by machining or casting. An annular second piston sealing member (e.g., O-ring) 61 is disposed in the annular groove 53. Thus, each of the secondary pistons 54 is sealed within one of the bosses 58 of the main piston 52 by the first piston sealing member 85, and the main piston 52 is sealed within one of the piston cups 80 of the cover shell 20 by the second piston sealing member 61. According to the exemplary embodiment of the present invention, the secondary pistons 54 are axially reciprocatingly and sealingly moveable relative to both the main piston 52, while the main piston 52 is axially reciprocatingly and sealingly moveable relative to the cover shell 20 of the casing 12. The first piston sealing member 85, mounted to a radially outer peripheral surface of each of the secondary pistons 54, creates a seal at the interface of the main piston 52 and each of the secondary pistons 54, while the second piston sealing member 61, mounted to a radially outer peripheral surface of each of the bosses 58 of the main piston 52, creates a seal at the interface of the main piston 52 and each of the piston cups 80 of the cover shell 20.

Moreover, each of the secondary pistons 54 is axially biased by at least one compression spring (such as a coil spring) 78 away from the cover shell 20 of the casing 12, as best shown in FIGS. 2-5. The compression spring 78 is disposed within the hollow chamber 73 of the secondary piston 54 between the head member 70 of the secondary piston 54 and a radial wall 82 of the piston cup 80 of the cover shell 20. A free distal end 75 of the piston rod 74 is provided with a snap ring 77, for example, disposed outside of the cover shell 20 for limiting axial movement of the secondary piston 54 in the direction toward the turbine wheel 26 and away from the cover shell 20 when the snap ring 77, mounted on the piston rod 74 of the secondary piston 54, engages the radial wall 82 of the piston cup 80 of the cover shell 20. The piston rod 74 of the secondary piston 54 has an annular groove 71 (best shown in FIG. 9) formed therein into which the snap ring 77 is received. The free distal end 75 of the piston rod 74 has an outermost conical part 76k, and an inner cylindrical part 76c adjacent to the snap ring 77 and located between the annular groove 71 and the outermost conical part 76k, as best shown in FIG. 9. Each of the secondary pistons 54 is axially moveable relative to the main piston 52 and the piston cup 80 of the cover shell 20 between an extended position and a retracted position with respect to the main piston 52.

In the extended position, best shown in FIGS. 2-5 and 13-18B, the secondary piston 54 extends into a bore of the axially protruding boss 58 of the main piston 52 away from the radial wall 82 of the piston cup 80 of the cover shell 20, so that the snap ring 77 on the piston rod 74 of the secondary piston 54 engages the radial wall 82 of the piston cup 80 of the cover shell 20. Moreover, the compression spring 78 biases the secondary pistons 54 to the extended position.

In the retracted position, best shown in FIGS. 21-24, the secondary pistons 54 are retracted into the piston cup 80 of the cover shell 20 toward the radial wall 82 of the piston cup 80, so that the snap rings 77 on the piston rods 74 of the secondary pistons 54 are axially spaced away from the radial wall 82 of the piston cup 80 of the cover shell 20 toward the selective clutch 18.

The torsional vibration damper 18 includes an input (or drive) member 64, a plurality of circumferentially acting elastic members (springs) 65, and an output (or driven) member 66 elastically coupled to the drive member 64 through the elastic members 65. The drive member 64 is fixed to the crankshaft 5 of the ICE 4 by appropriate means, such as by mechanical fasteners or welding. The driven member 66 is connected to the casing 12 through the SOWC 90. The elastic members 65 are disposed in series relative to each other between the drive member 64 and the driven member 66, as best shown in FIG. 4.

The selectable one-way clutch (SOWC) 90 disposed between the output shaft 5 of the ICE and the cover shell 20 selectively drivingly connects the casing 12 of the hydrokinetic torque-coupling device 10 to the crankshaft 5 of the ICE 4 through the torsional vibration damper 18. Moreover, the SOWC 90 is disposed outside of the casing 12 and is mounted to the support boss 23 of the cover shell 20 through a bearing 91, as best shown in FIGS. 2 and 3. The SOWC 90 comprises an outer race 92, an inner race 94, a plurality of torque transmitting elements disposed radially between the outer race 92 and the inner race 94. According to the exemplary embodiment of the present invention, the torque transmitting elements are in the form of first and second rollers (such as cylindrical rollers) $96_1$ and $96_2$, respectively, arranged in pairs in a radial gap between the outer race 92 and the inner race 94. In other words, the SOWC 90 comprises a plurality of pairs of first and second rollers $96_1$ and $96_2$ arranged in pairs and disposed radially between the outer race 92 and the inner race 94 and contactable with both the outer and inner races 92, 94.

Figure 10:
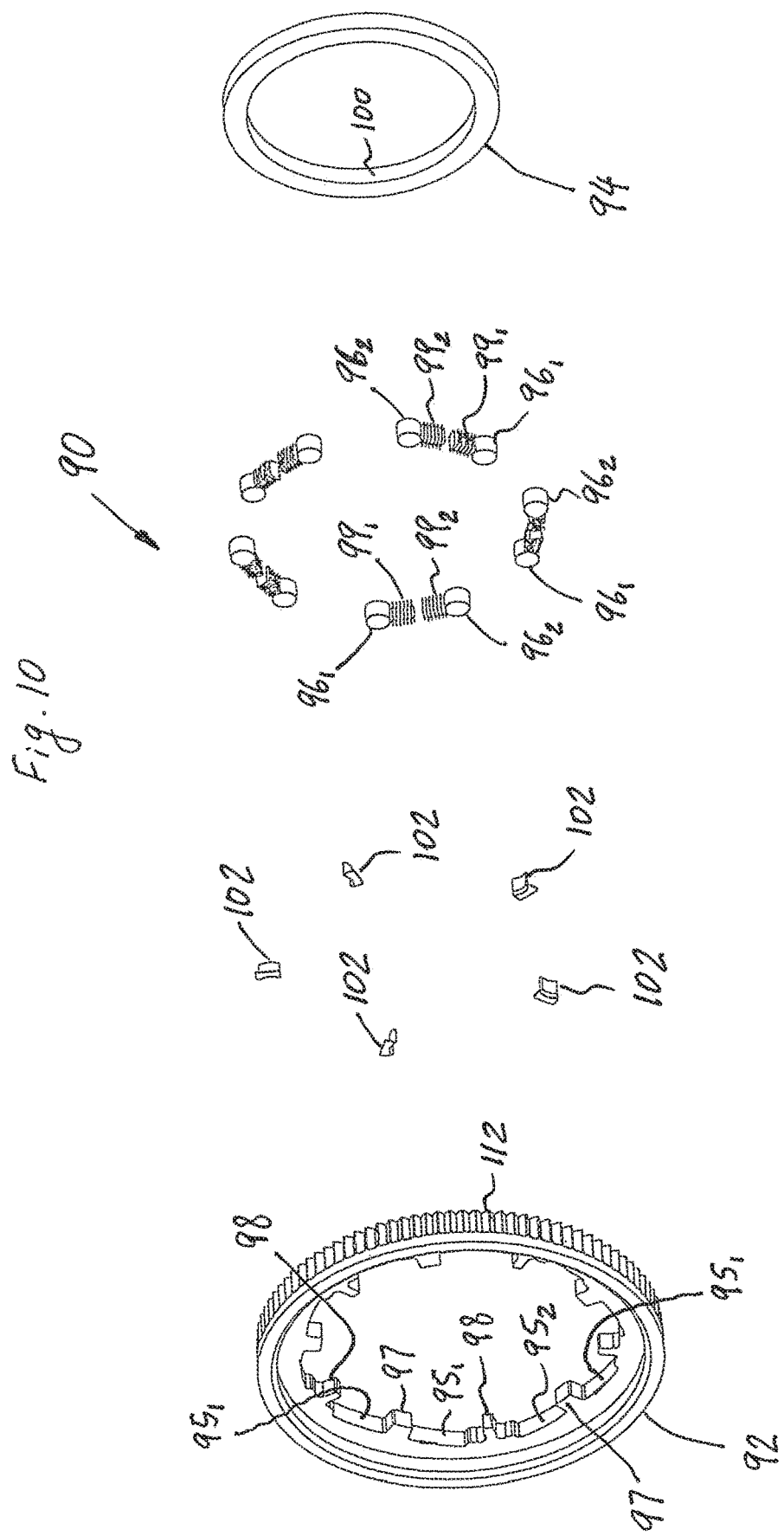
FIG. 10 is an exploded assembly view of the selectable one-way clutch (SOWC) in accordance with the first exemplary embodiment of the present invention.
Figure 11:
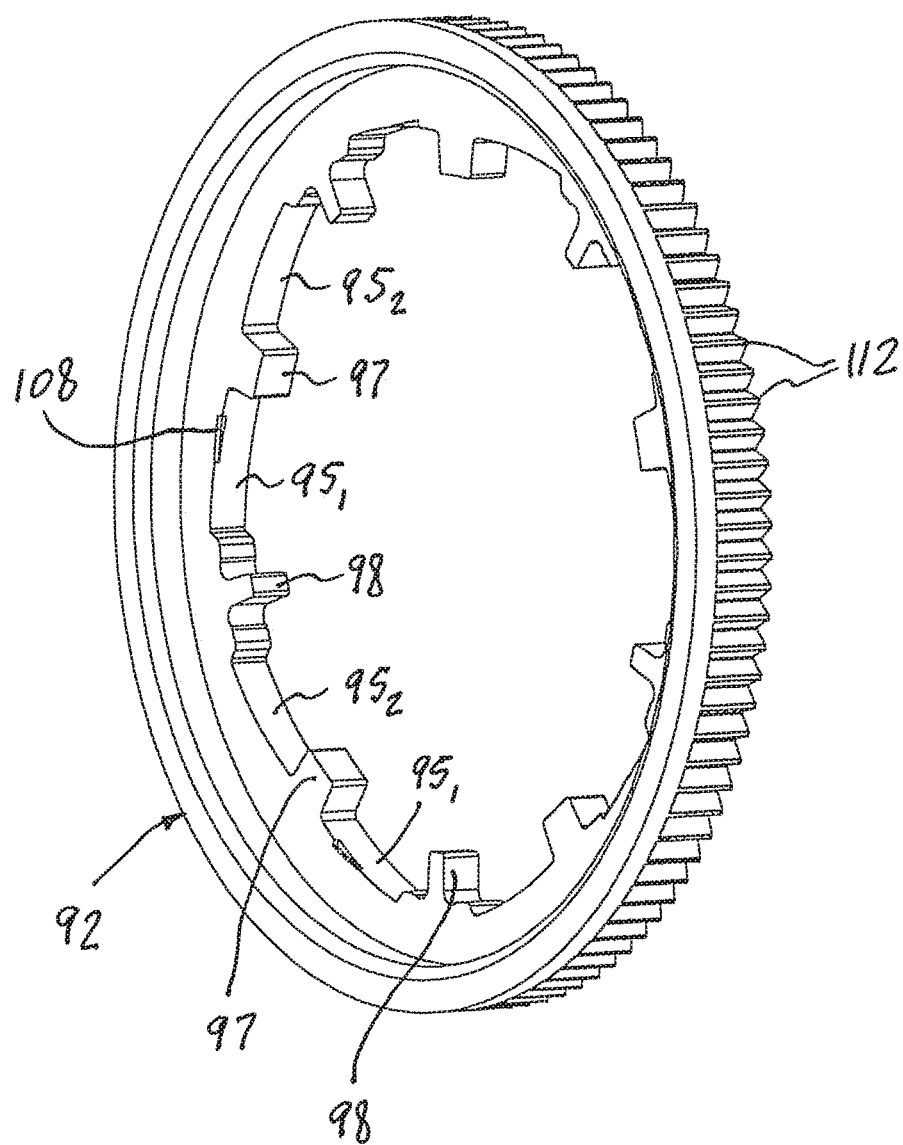
FIG. 11 is a perspective view of an outer race of the SOWC in accordance with the exemplary embodiment of the present invention.

The outer race 92 includes a radially inner surface 93 defining an outer raceway of the SOWC 90 as is known in the art of roller one-way roller clutches. The outer race 92 of the SOWC 90 is non-rotatably secured (i.e., fixed) to the cover shell 20 by an appropriate means, such as a weld 101, as best shown in FIGS. 3 and 5. In other words, the outer race 92 of the SOWC 90 is non-rotatable relative to the casing 12. Moreover, a radially outer annular peripheral surface of the outer race 92 has multiple radial outer teeth (or splines) 112 (as best shown in FIGS. 10 and 11) configured to be engaged by the continuous belt 9 (or pinion gear), as shown in FIG. 1.

The radially inner surface 93 of the outer race 92 includes a plurality of evenly circumferentially spaced first and second cam ramps $95_1$ and $95_2$, respectively, arranged in pairs. Moreover, the number of pairs of the first and second cam ramps $95_1$ and $95_2$ corresponds to a number of pairs of the first and second rollers $96_1$ and $96_2$. As best shown in FIGS. 11, 13, 15, 16, 17 and 18A, the pairs of the cam ramps $95_1$ and $95_2$ are circumferentially separated by spacing blocks 97 radially inwardly extending from the inner surface 93 of the outer race 92, while the first and second cam ramps $95_1$ and $95_2$ of each of the pairs of the cam ramps $95_1$ and $95_2$ are circumferentially separated by a separator 98 also radially inwardly extending from the inner surface 93 of the outer race 92. As further illustrated in FIGS. 10 and 11, both the spacing blocks 97 and the separator 98 are formed integrally with the outer race 92.

The first and second rollers $96_1$ and $96_2$ of each of the pairs of the first and second rollers $96_1$ and $96_2$ are biased by corresponding first and second roller springs $99_1$ and $99_2$, respectively, against the first and second cam ramps $95_1$ and $95_2$, respectively. The first and second roller springs $99_1$ and $99_2$ of each pair of the first and second rollers $96_1$ and $96_2$ are circumferentially separated by the separator 98, as best shown in FIG. 10.

The inner race 94 includes a cylindrical radially inner raceway 100 coaxial with the rotational axis X. Also, the inner race 94 of the SOWC 90 is mounted to the support boss 23 of the cover shell 20 through the bearing 91, as best shown in FIGS. 2 and 3. In other words, the inner race 94 of the SOWC 90 is rotatable relative to the casing 12. Moreover, the driven member 66 of the torsional vibration damper 18 is non-moveably attached to the inner race 94 of the SOWC 90 by appropriate means, such as by fasteners or a weld 67, as best shown in FIGS. 4 and 5.

The first and second rollers $96_1$ and $96_2$ of each pair of the rollers are biased by the first and second roller springs $99_1$ and $99_2$ into engagement with the first and second cam ramps $95_1$ and $95_2$, respectively, on the inner surface 93 of the outer race 92. As a result, the first and second rollers $96_1$ and $96_2$ become wedged (or jammed) between the first and second cam ramps $95_1$ and $95_2$, respectively, of the outer race 92 and the inner raceway 100 of the inner race 94, and non-rotatably couple (or lock) the outer race 92 and the inner race 94 together to rotate as a unit. In other words, the first and second rollers $96_1$ and $96_2$ are moveable along the first and second cam ramps $95_1$ and $95_2$, respectively, between an engaged position, when the first and second rollers $96_1$ and $96_2$ are wedged between the first and second cam ramps $95_1$ and $95_2$, respectively, of the outer race 92 and the inner raceway 100 of the inner race 94 due to a biasing force of the first and second roller springs $99_1$ and $99_2$, respectively, and into a disengaged position when the first and second rollers $96_1$ and $96_2$ are displaced against the biasing force of one of the first and second roller springs $99_1$ and $99_2$, and are not wedged between the first and second cam ramps $95_1$ and $95_2$, respectively, of the outer race 92 and the inner raceway 100 of the inner race 94. Moreover, the first and second rollers $96_1$ and $96_2$ are so arranged that one of the first and second rollers $96_1$ and $96_2$ of each pair of rollers $96_1$, $96_2$ operates to prevent relative rotation of the inner and outer races 94, 92 in one direction and the other one of the first and second rollers $96_1$ and $96_2$ of each pair of rollers $96_1$, $96_2$ prevents relative rotation of the inner and outer races 94, 92 in the opposite direction.

Figure 12:
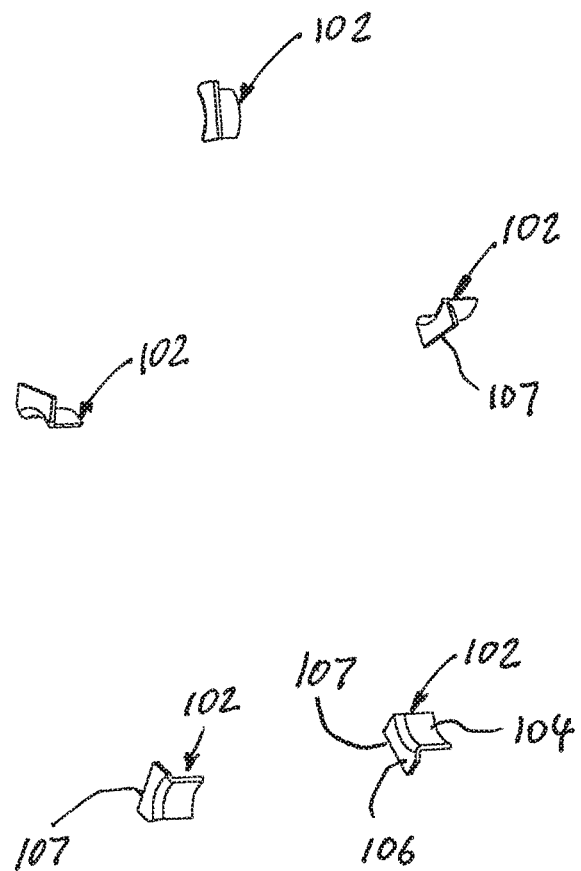
FIG. 12 is a perspective view of actuator members of the SOWC in accordance with the exemplary embodiment of the present invention.
Figure 13:
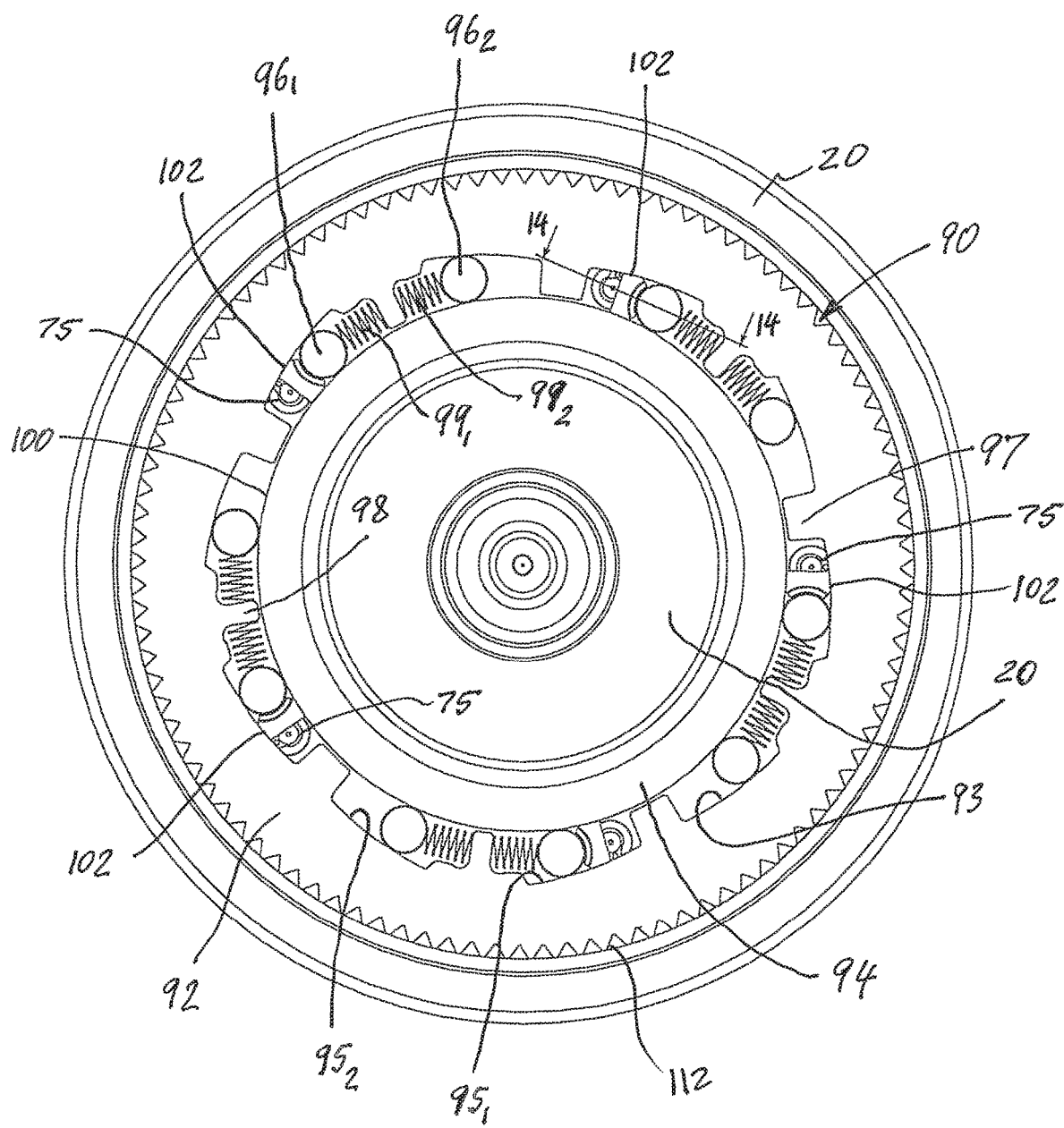
FIG. 13 is a front view of the SOWC in accordance with the exemplary embodiment of the present invention in a deactivated state also showing free distal ends of piston rods of the secondary pistons acting on the actuator members of the SOWC.
Figure 14:
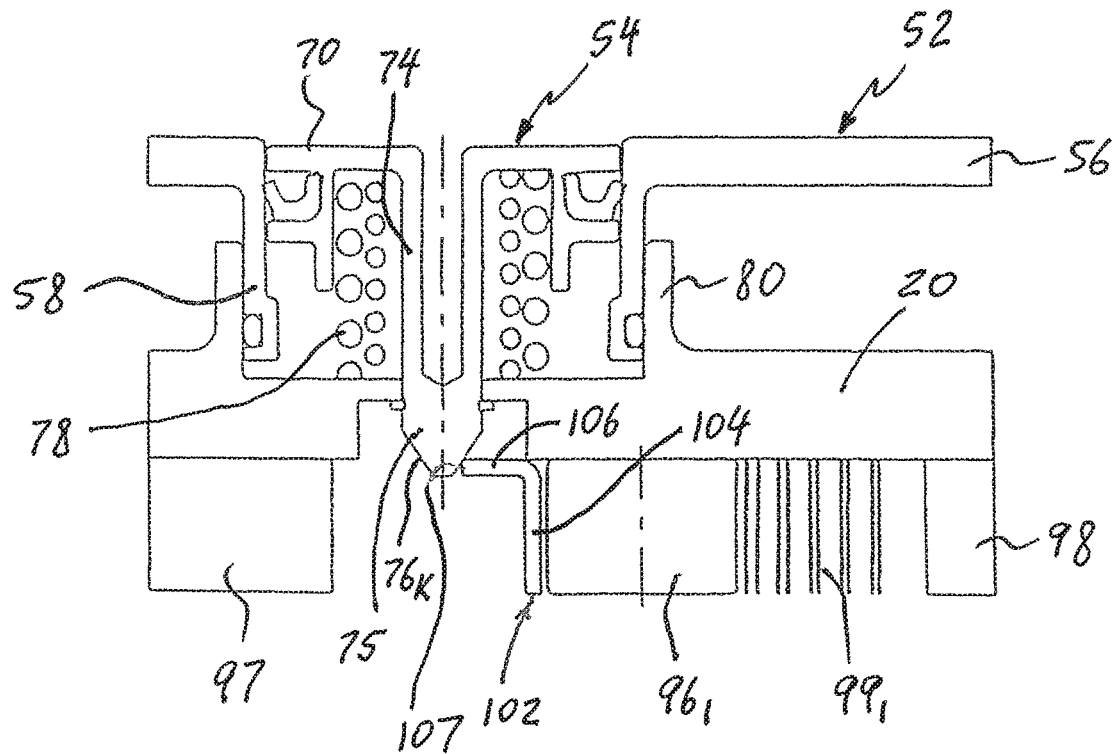
FIG. 14 is a cross-sectional view of the SOWC according to the exemplary embodiment of the present invention taken along the lines 14-14 in FIG. 13.
Figure 15:
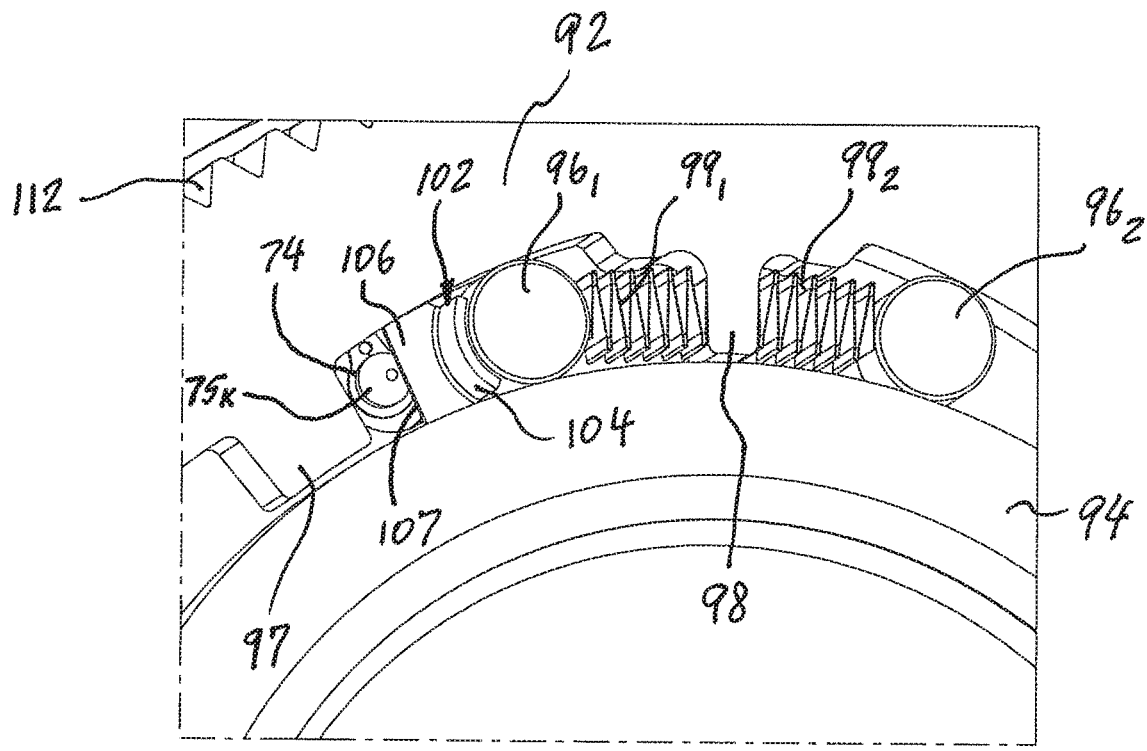
FIG. 15 is an enlarged perspective front view of the SOWC in accordance with the exemplary embodiment of the present invention in the deactivated state showing a pair of first and second rollers and the free distal end of the piston rod of the secondary piston.
Figure 16:
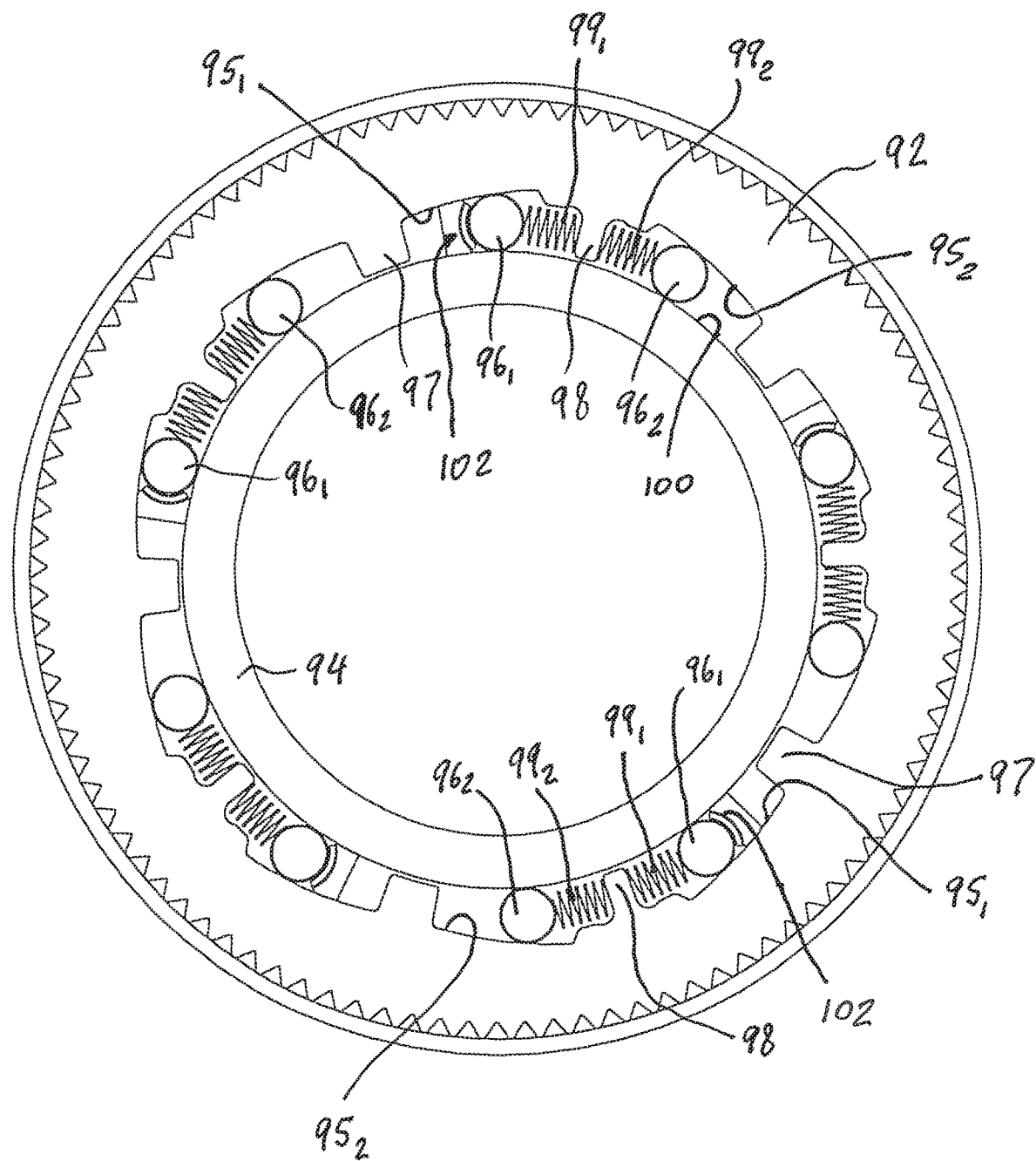
FIG. 16 is a front view of the SOWC in accordance with the exemplary embodiment of the present invention in the deactivated state without showing the free distal ends of the piston rods of the secondary pistons acting on the actuator members of the SOWC.
Figure 17:
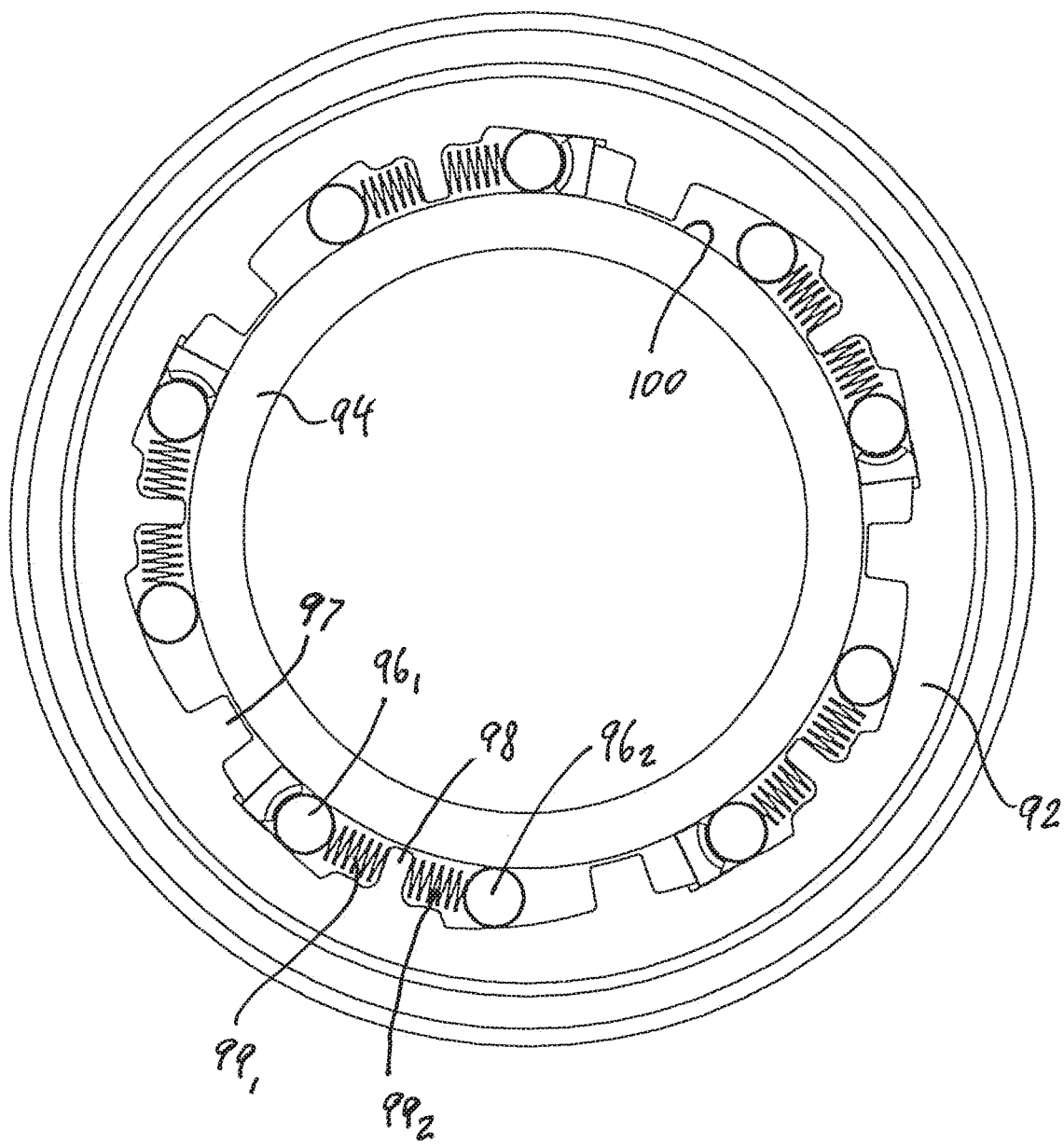
FIG. 17 is a rear view of the SOWC in the deactivated state in accordance with the exemplary embodiment of the present invention.
Figure 18A:
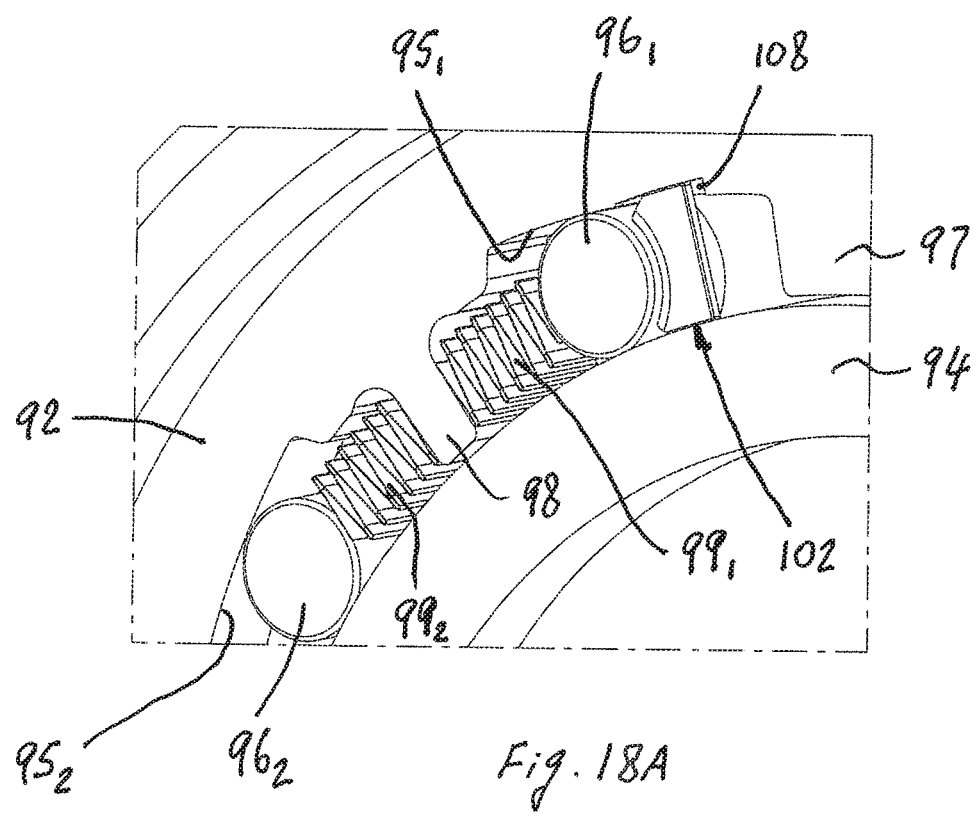
FIG. 18A is an enlarged rear sectional view of the SOWC in accordance with the exemplary embodiment of the present invention in the deactivated state showing a pair of first and second rollers.
Figure 18B:
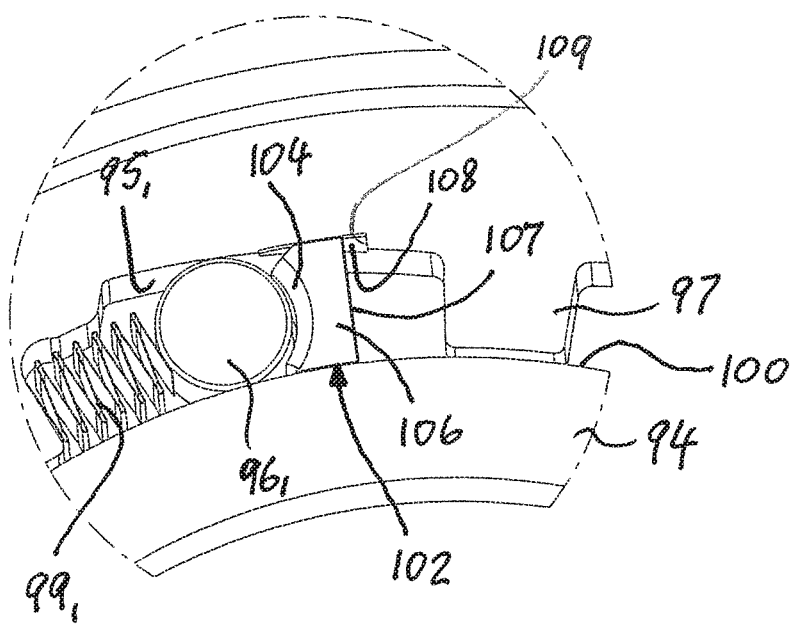
FIG. 18B is an enlarged rear sectional view of the SOWC in accordance with the exemplary embodiment of the present invention in the deactivated state showing a first roller and a corresponding actuator member.

The SOWC 90 further comprises a plurality of actuator members 102, each operatively associated with one pair of the first and second rollers $96_1$ and $96_2$. Specifically, each of the actuator members 102 is configured to be in contact with the first roller $96_1$ of one pair of the first and second rollers 96₁ and 96₂, as best shown in FIGS. 13 and 15-18A. According to the exemplary embodiment of the present invention, the actuator members 102 are preferably structurally and functionally identical. Moreover, the number of the actuator members 102 corresponds to the number of the secondary pistons 54 of the dual piston assembly 44 and to the number of pairs of the first and second rollers 96₁ and 96₂. Furthermore, as best shown in FIGS. 12 and 14, each of the actuator members 102 includes a concave support portion 104 adjacent to and configured to engage an annular outer peripheral surface of the first roller 96₁, and an actuator portion 106 outwardly extending from the concave support portion 104 away from the first roller 96₁ and toward the adjacent spacing block 97.

Each of the actuator members 102 is configured to cooperate with one of the secondary pistons 54 of the dual piston assembly 44. Specifically, the actuator portion 106 of each of the actuator members 102 has an actuator edge 107 configured to engage the free distal end 75 of the piston rod 74 of the secondary pistons 54, as best shown in FIGS. 5, 13, 14 and 15. Also, each of the actuator members 102 is circumferentially displaceable along the outer raceway 93 of the outer race 92 and the inner raceway 100 of the inner race 94. Moreover, the outer raceway 93 of the outer race 92 is formed with a plurality of arc-shaped guide grooves 108, each having a stopping end 109 configured to limit circumferential displacement of the actuator members 102 in the direction away from the separators 98 and toward the spacing blocks 97 to allow the first roller 96₁ to move to the engaged position thereof. Specifically, the circumferential displacement of the actuator members 102 is stopped when the actuator edges 107 of the actuator members 102 engage the stopping ends 109 of the arc-shaped guide grooves 108.

Moreover, the secondary pistons 54 of the dual piston assembly 44 are configured to circumferentially displace the actuator members 102 along the inner raceway 100 of the inner race 94. Consequently, the actuator members 102 circumferentially displace the first rollers 96₁ against the action of the corresponding first roller springs 99₁ out of the engaged position (i.e., wedging engagement) with the first cam ramps 95₁ of the outer race 92 and retain the first rollers 96₁ in the disengaged position.

As best illustrated in FIGS. 5, 13, 14 and 15, when the secondary pistons 54 are in the extended positions, the actuator edges 107 of the actuator portions 106 of the actuator members 102 engage the conical parts 76k of the free distal ends 75 of the piston rods 74 of the secondary pistons 54 near tips of the piston rods 74. In the extended position of the secondary pistons 54, the actuator members 102 are not displaced by the piston rods 74. Thus, the first rollers 96₁ are in the engaged position thereof, i.e., in narrow ends of the first cam ramps 95₁. Moreover, when the secondary pistons 54 are in the extended positions, the SOWC 90 is in a deactivated state (illustrated in FIGS. 5 and 13-18B) and configured to transmit torque in both (clockwise and counterclockwise) rotational directions.

When the secondary pistons 54 move to the retracted position, the conical parts 76k of the free distal ends 75 of the piston rods 74 of the secondary pistons 54 displace the actuator members 102 away from the narrow ends of the first cam ramps 95₁. In turn, the concave support portions 104 of the actuator members 102 push the first roller 96₁ away from the narrow ends of the first cam ramps 95₁ to the disengaged position so that the first rollers 96₁ cannot jam between the outer and inner races 92, 94 of the SOWC 90. Thus, the secondary pistons 54 of the dual piston assembly 44 act as actuators of the SOWC 90.

Figure 23:
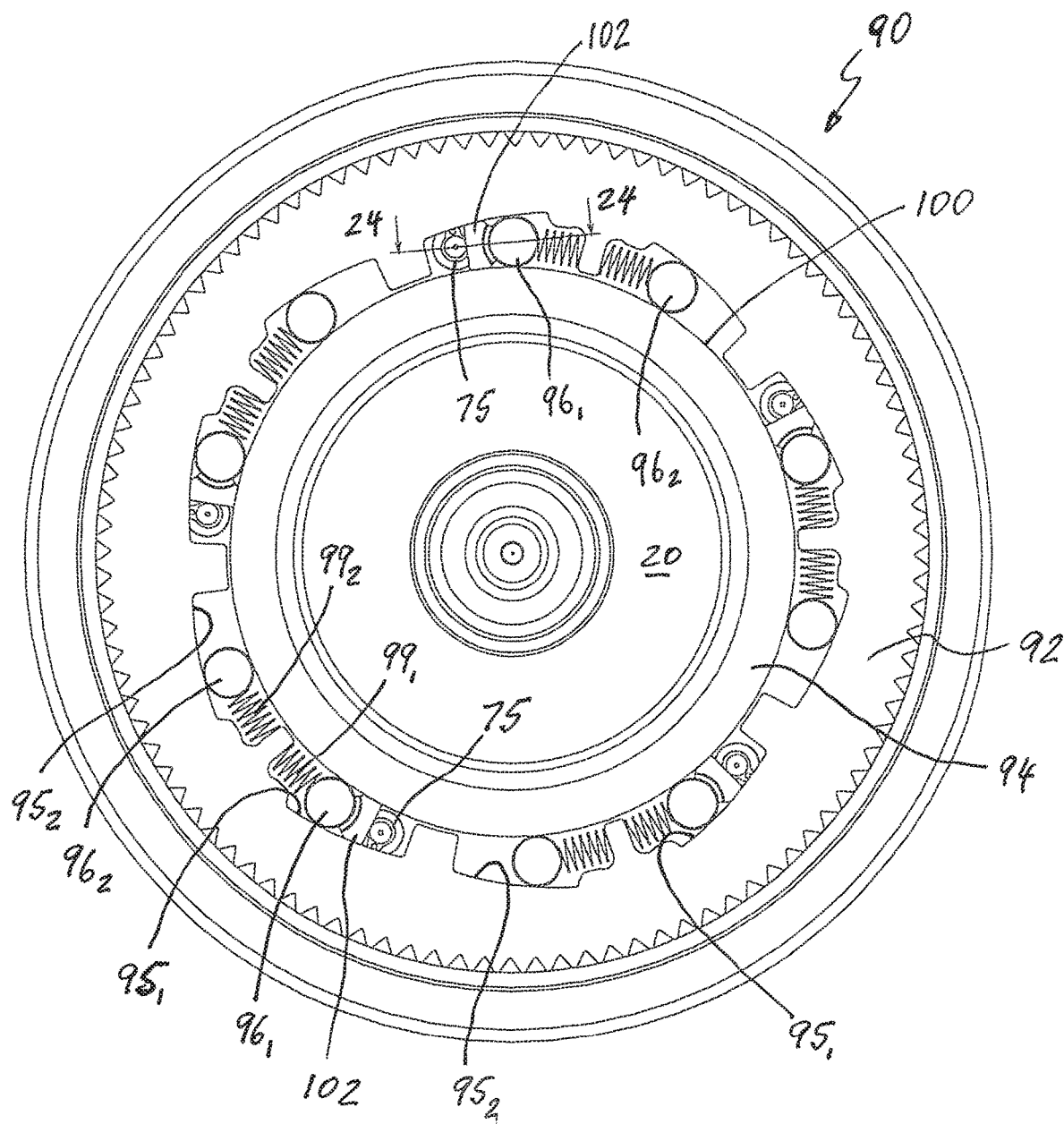
FIG. 23 is a front sectional view of the SOWC in accordance with the exemplary embodiment of the present invention in an activated state also showing the free distal ends of the piston rods of the secondary pistons acting on the actuator members of the SOWC.
Figure 24:
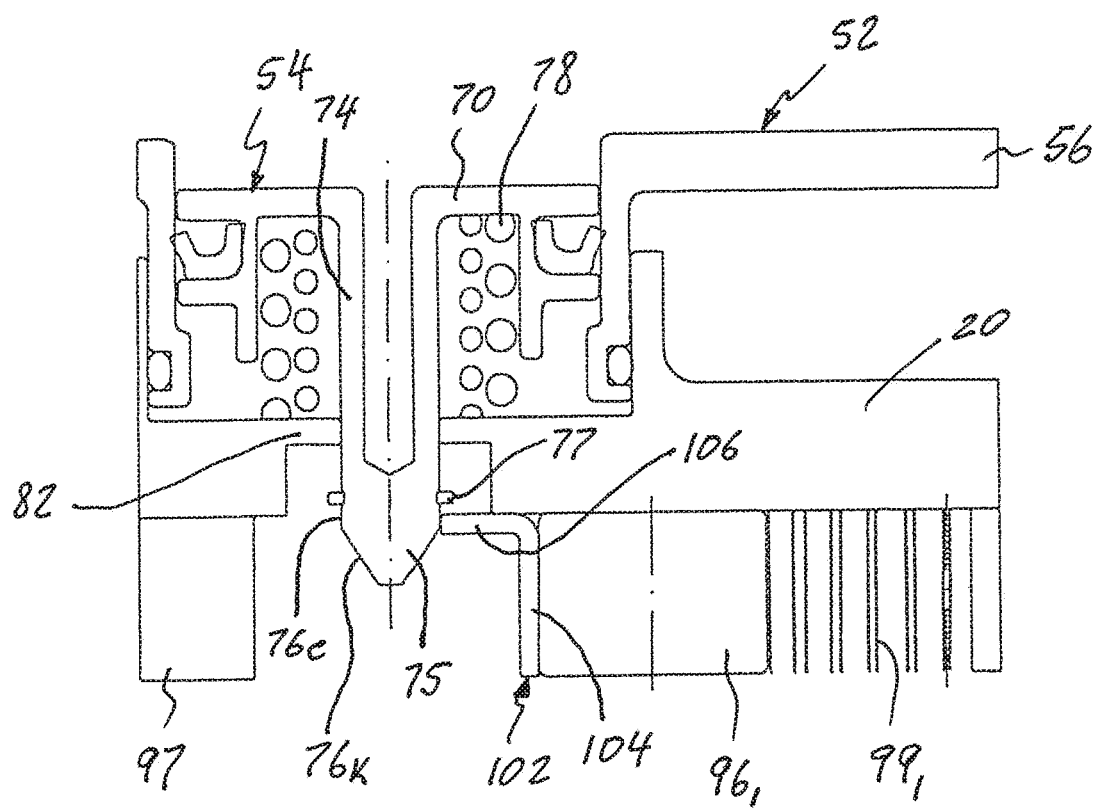
FIG. 24 is a cross-sectional view of the SOWC according to the exemplary embodiment of the present invention taken along the lines 24-24 in FIG. 23.
Figure 26:
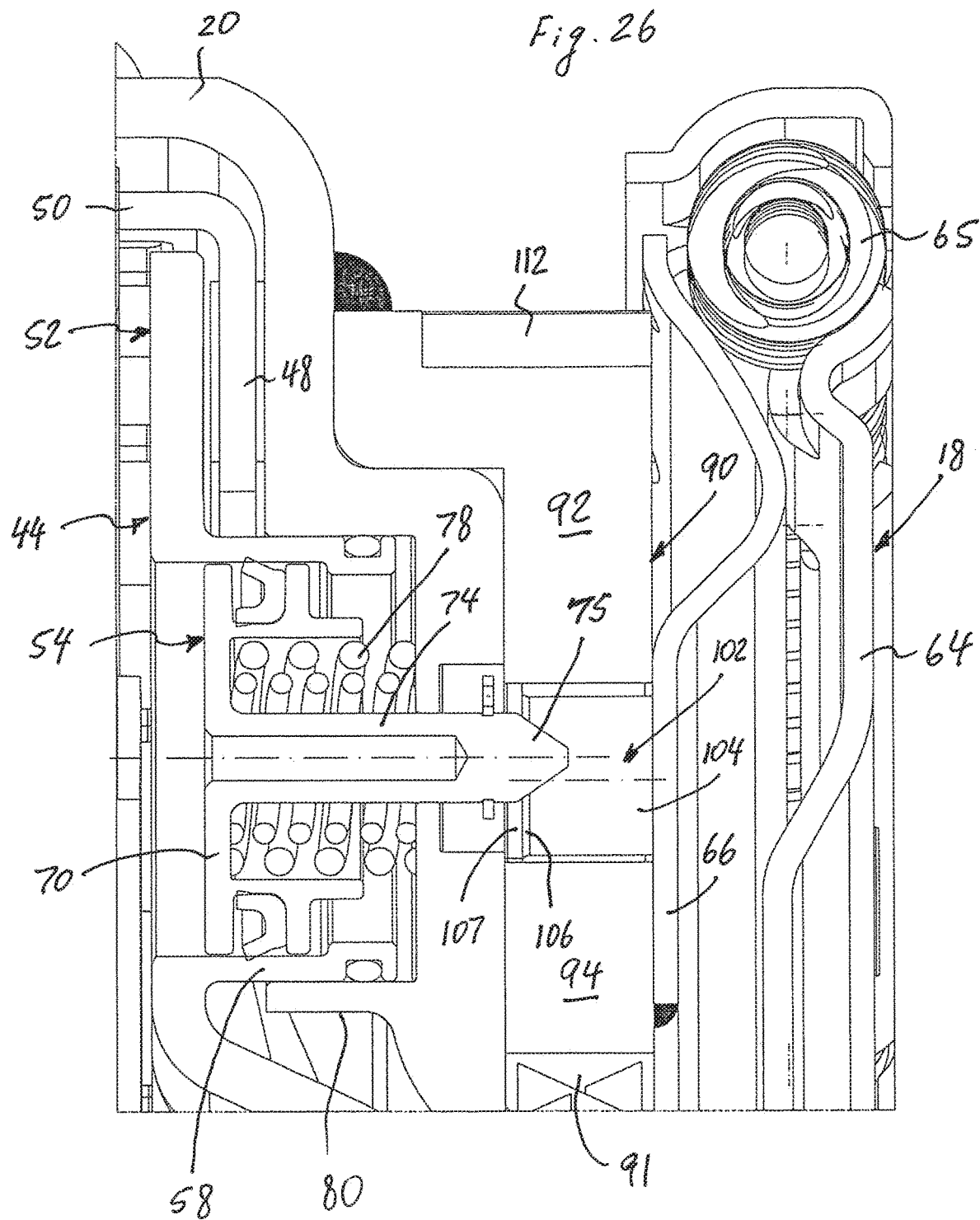
FIG. 26 is an enlarged view of a fragment of the hydrokinetic torque-coupling device shown in the rectangle "26" of FIG. 25.

When the secondary pistons 54 reach the retracted position (i.e., when the secondary pistons 54 is in a right innermost position shown in FIGS. 23, 24 and 26), the actuator edges 107 of the actuator portions 106 of the actuator members 102 engage the inner cylindrical part 76c of the free distal ends 75 of the piston rods 74 of the secondary pistons 54 near tips of the piston rods 74. When the secondary pistons 54 are in the retracted positions, the first rollers 96₁ are in the disengaged position so that the first rollers 96₁ cannot jam between the outer and inner races 92, 94 of the SOWC 90. Accordingly, the SOWC 90 is in an activated state and configured to transmit torque only in one (counterclockwise in FIG. 13) rotational direction and freewheel in the opposite (clockwise in FIG. 13) rotational direction.

The compression spring 78 of each of the secondary pistons 54 is sized to resist fluid pressure of 500 KPa. In other words, when the fluid pressure in the apply chamber $C_A$ is equal to or more than 500 KPa, the secondary pistons 54 move rightward in the direction of FIGS. 2-5 toward the cover shell 20 of the casing 12 and circumferentially displace the first rollers 96₁ of the SOWC 90 to the disengaged position by means of the actuator members 102. Those skilled in the art will recognize that pressures other than 500 KPa may be used, depending upon the design.

The hydrokinetic torque-coupling device 10 in accordance with the present invention has four modes of operation.

In a first mode of operation, illustrated in FIGS. 2-5, a release pressure of the lock-up clutch 16 in the release chamber $C_R$ is about 500 KPa, while an apply pressure of the lock-up clutch 16 in the apply chamber $C_A$ is about 200 KPa. Consequently, the main piston 52 is in the non-lockup position and the secondary pistons 54 are in the extended position, in which both the main piston 52 and the secondary pistons 54 are spaced from the cover shell 20 to the maximum distance, so that the friction portion 48 of the friction ring 42 does not frictionally engage the locking surface 12e of the cover shell 20 of the casing 12 by the main piston 52 (i.e., the non-lockup position of the lock-up clutch 16), and the SOWC 90 is in the deactivated state (illustrated in FIGS. 5 and 13-18B). In the first mode of operation, the main piston 52 is axially spaced from the friction ring 42, and the torque-coupling device 10 is in a hydrodynamic mode with the ICE 4 drivingly coupled thereto through the SOWC 90 and the torsional vibration damper 18.

In a second mode of operation, illustrated in FIGS. 19-20, the apply pressure of the lock-up clutch 16 in the apply chamber $C_A$ is between 0-500 KPa, preferably between 100-500 KPa. Consequently, the main piston 52 moves toward the cover shell 20 against the resilient force of the tongues 89 toward the lockup position, in which the main piston 52 presses against the friction portion 48 of the friction ring 42 to frictionally non-rotatably engage the friction ring 42 against the locking surface 12e of the cover shell 20 of the casing 12 (i.e., the lockup position of the lock-up clutch 16). The secondary pistons 54 remain in the extended position, in which the SOWC 90 is in the deactivated state. In the second mode of operation, the ICE 4 and the transmission shaft 8 are directly connected. In the second mode of operation a battery of the hybrid vehicle may be in a charging mode.

Figure 22:
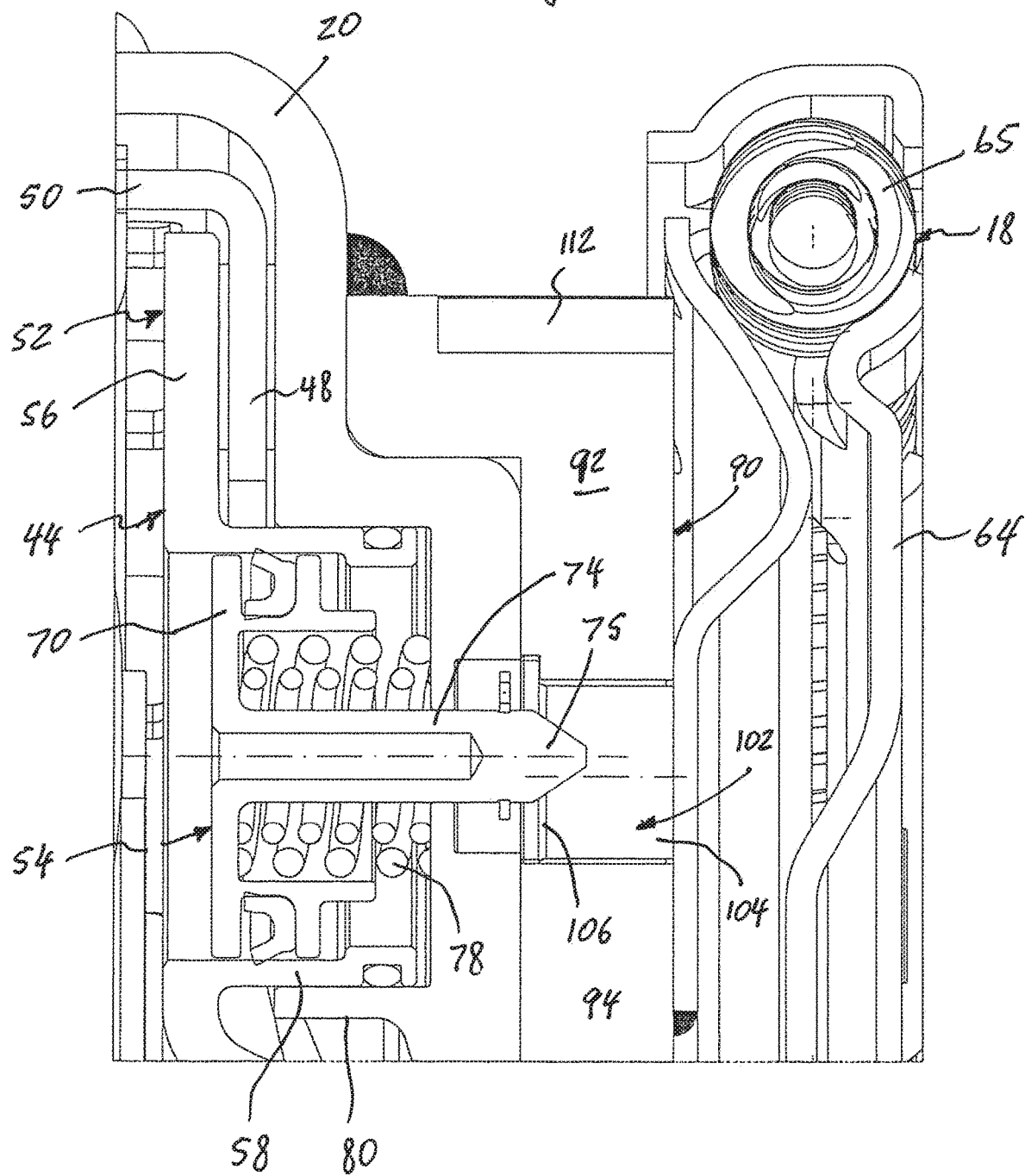
FIG. 22 is an enlarged view of a fragment of the hydrokinetic torque-coupling device shown in the rectangle "22" of FIG. 21.

In a third mode of operation, illustrated in FIGS. 21-22, the apply pressure of the lock-up clutch 16 in the apply chamber $C_A$ is between 500-800 KPa. Consequently, the secondary pistons 54 move rightward in the direction toward the cover shell 20 of the casing 12 and the SOWC 90 to the retracted position, and place the SOWC 90 in the activated state. Specifically, the free distal ends 75 of the piston rods 74 push the actuator members 102 away from the narrow ends of the first cam ramps 95₁. In turn, the concave support portions 104 of the actuator members 102 push the first roller 96₁ away from the narrow ends of the first cam ramps 95₁ against the resilient force of the first roller springs 99₁ to the disengaged position so that the first rollers 96₁ cannot jam between the outer and inner races 92, 94 of the SOWC 90, and place the SOWC 90 in the activated state. The main piston 52 remains in the lockup position. In the third mode of operation, the ICE 4 and the casing 12 of the hydrokinetic torque-coupling device 10 (thus the transmission shaft 8) are disconnected, while the electric machine 6 and the transmission shaft 8 are directly connected. The ICE 4 may be off. The hybrid vehicle is in re-generation mode or an electric-drive (or E-drive) mode.

Figure 25:
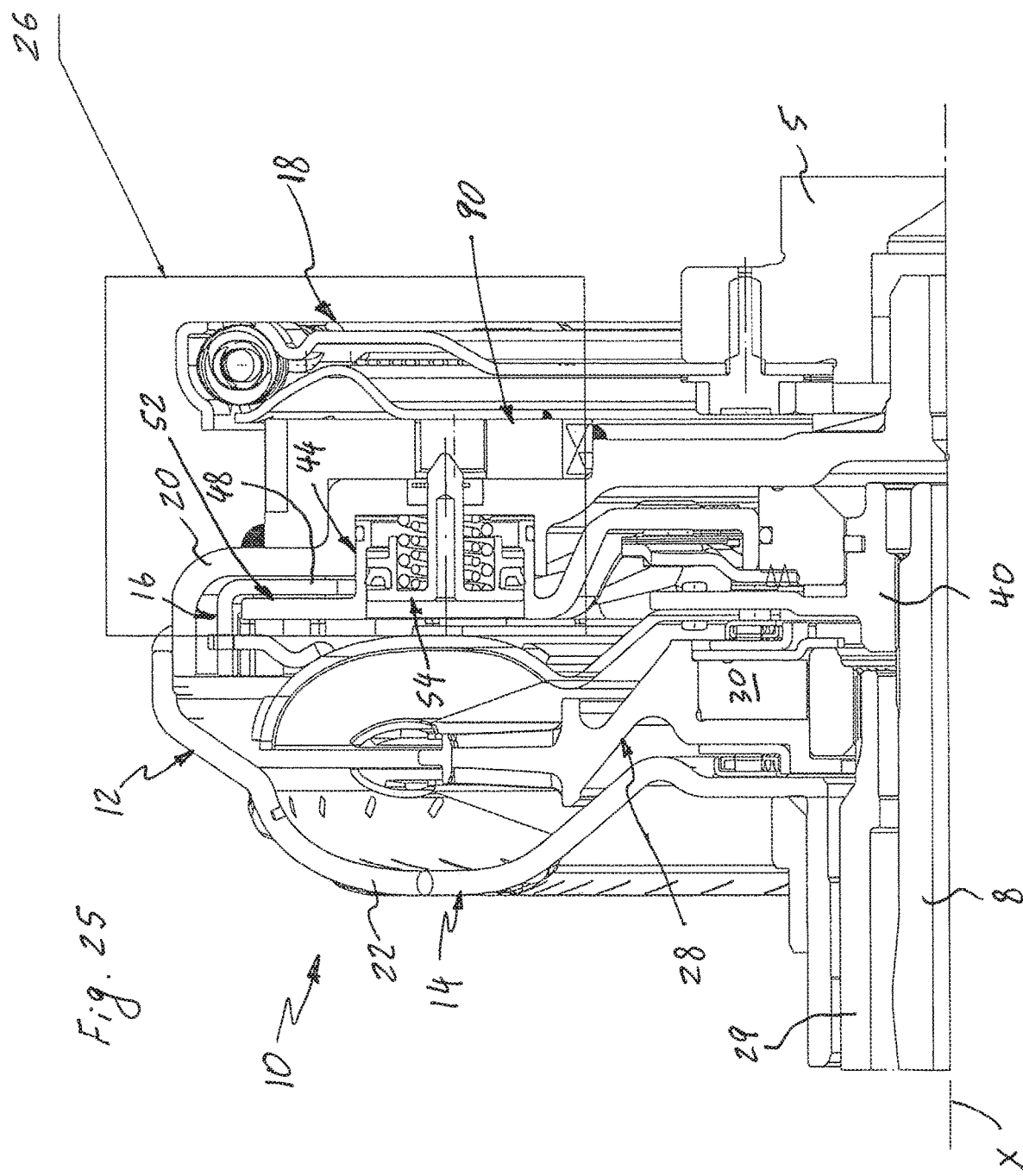
FIG. 25 is a sectional view of the hydrokinetic torque-coupling device in accordance with the exemplary embodiment of the present invention in a fourth mode of operation.

In a fourth mode of operation, illustrated in FIGS. 25 and 26, the release pressure of the lock-up clutch 16 in the release chamber $C_R$ is about 800 KPa, and the apply pressure of the lock-up clutch 16 in the apply chamber $C_A$ is also about 800 KPa. Consequently, the secondary pistons 54 remain in the retracted position and maintain the SOWC 90 in the activated state. However, the main piston 52 moves leftward (as illustrated in FIGS. 25 and 26) away from the cover shell 20 of the casing 12 to the non-lockup position of the lock-up clutch 16. In the fourth mode of operation, the ICE 4 is on and ready to switch to the first mode of operation.

Various modifications, changes, and alterations may be practiced with the above-described embodiment, including but not limited to the additional embodiments shown in FIGS. 2-26.

The foregoing description of the exemplary embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque-coupling device for a hybrid electric vehicle, comprising:
    a casing rotatable about a rotational axis;
    a torque converter including an impeller wheel and a turbine wheel disposed in the casing coaxially with the impeller wheel;
    a lockup clutch including a dual piston assembly and being switchable between a hydrodynamic transmission mode, in which the turbine wheel is rotatable relative to the casing, and a lockup mode, in which the turbine wheel is non-rotatably coupled to the casing; and
    a selectable one-way clutch disposed outside of the casing, the selectable one-way clutch including an outer race, a plurality of pairs of torque transmitting elements each including first and second torque transmitting elements, an inner race drivingly and non-rotatably connectable to the outer race through the first and second torque transmitting elements, and a plurality of actuator members configured to circumferentially displace the first torque transmitting elements in each of the pairs of the torque transmitting elements;
    each of the first and second torque transmitting elements of each of the pairs of the torque transmitting elements selectively circumferentially moveable relative to at least one of the outer race and the inner race between an engaged position, in which the outer race is non-rotatably coupled to the inner race of the selectable one-way clutch, and a disengaged position, in which the outer race is rotatable relative to the inner race of the selectable one-way clutch;
    the dual piston assembly including a main piston and at least one secondary piston mounted to the main piston and axially moveable relative to the main piston and the casing;
    the main piston of the dual piston assembly selectively axially moveable relative to the casing and the at least one secondary piston between a lockup position, in which the main piston is non-rotatably coupled to the casing, and a non-lockup position, in which the main piston is rotatable relative to the casing;
    the at least one secondary piston having a plurality of actuator rods unitary with the at least one secondary piston;
    the first torque transmitting elements of each of the pairs of the torque transmitting elements selectively circumferentially moveable from the engaged position to the disengaged position by axial movement of the actuator rods of the at least one second lockup piston acting to the actuator members.

2. The hydrokinetic torque-coupling device as defined in claim 1, wherein the outer race is non-moveably secured to the casing, and wherein the inner race is rotatable relative to the casing.

3. The hydrokinetic torque-coupling device as defined in claim 1, wherein each of the actuator members is configured to cooperate with one of the actuator rods of the at least one secondary piston.

4. The hydrokinetic torque-coupling device as defined in claim 1, wherein the dual piston assembly includes a plurality of secondary pistons mounted to the main piston and axially moveable relative to the main piston and the casing, and wherein each of the secondary pistons has one of the actuator rods unitary with one of the secondary pistons.

5. The hydrokinetic torque-coupling device as defined in claim 1, wherein each of the actuator members is circumferentially displaceable along an inner raceway of the inner race.

6. The hydrokinetic torque-coupling device as defined in claim 1, wherein the first and second torque transmitting elements are first and second rollers, respectively.

7. The hydrokinetic torque-coupling device as defined in claim 6, wherein each of the actuator members includes a support portion adjacent to and configured to engage one of the first rollers of each of the pairs of the torque transmitting elements, and an actuator portion outwardly extending from the support portion away from the first roller.

8. The hydrokinetic torque-coupling device as defined in claim 1, wherein a free distal end of each of the actuator rods of the at least one secondary piston has a conical part adjacent to a tip of each of the piston rods.

9. The hydrokinetic torque-coupling device as defined in claim 8, wherein the conical part of the free distal end of each of the actuator rods of the at least one secondary piston is configured to cooperate with an actuator edge of the actuator portion of one of the actuator members.

10. The hydrokinetic torque-coupling device as defined in claim 1, wherein the at least one secondary piston is axially moveable relative to the main piston and the casing between an extended position and a retracted position with respect to the main piston, wherein the first torque transmitting element of each of the pairs of the torque transmitting elements is in the engaged position when the at least one secondary piston is in the extended position, and wherein the first torque transmitting element of each of the pairs of the torque transmitting elements is in the disengaged position when the at least one secondary piston is in the retracted position.

11. The hydrokinetic torque-coupling device as defined in claim 1, wherein the at least one secondary piston is axially biased toward the extended position by at least one compression spring.

12. The hydrokinetic torque-coupling device as defined in claim 1, wherein the first and second torque transmitting elements of each of the pairs of the torque transmitting elements is biased by corresponding first and second springs, respectively, toward the engaged positions thereof.

13. The hydrokinetic torque-coupling device as defined in claim 1, wherein a radially inner surface of the outer race includes a plurality of evenly circumferentially spaced first and second cam ramps arranged in pairs, and wherein a number of pairs of the first and second cam ramps corresponds to a number of pairs of the torque transmitting elements.

14. The hydrokinetic torque-coupling device as defined in claim 1, further comprising a torsional vibration damper disposed outside of the casing so that the selectable one-way clutch is disposed between the casing and the torsional vibration damper.

15. The hydrokinetic torque-coupling device as defined in claim 14, wherein the torsional vibration damper includes a drive member, a driven member and a plurality of circumferentially acting elastic members disposed in series relative to each other between the drive member and the driven member.

16. The hydrokinetic torque-coupling device as defined in claim 15, wherein the outer race is non-moveably secured to the casing, and wherein the inner race is non-moveably secured to the driven member of the torsional vibration damper and is rotatable relative to the casing.

17. The hydrokinetic torque-coupling device as defined in claim 1, wherein the casing includes a cover shell and an impeller shell disposed coaxially with and axially opposite to the cover shell, and wherein the cover shell and the impeller shell are non-movably connected to one another.

18. The hydrokinetic torque-coupling device as defined in claim 17, wherein the outer race of the selectable one-way clutch is non-rotatably connected to the cover shell of the casing, and wherein the inner race is rotatable relative to the casing.

19. The hydrokinetic torque-coupling device as defined in claim 17, wherein the main piston includes a radially oriented annular piston body and an annular hub portion having a cylindrical flange, and wherein the at least one secondary piston includes a head member, a cylindrical skirt defining a hollow chamber within the at least one secondary piston, and a piston rod axially extending from the head member through the main piston and through the cover shell of the casing.

20. The hydrokinetic torque-coupling device as defined in claim 17, wherein the main piston includes a radially oriented annular piston body and at least one axially protruding boss receiving the at least one secondary piston therein so that the at least one secondary piston is axially moveable relative the at least one boss of the main piston and the cover shell.

21. The hydrokinetic torque-coupling device as defined in claim 20, wherein the cover shell of the casing includes at least one axially protruding piston cup formed integrally with the cover shell of the casing and receiving the at least one boss of the main piston therein so that the at least one boss of the main piston is axially moveable relative the at least one piston cup of the cover shell of the casing.

22. A method of operation of a hydrokinetic torque-coupling device for a hybrid electric vehicle comprising an internal combustion engine and an electrical machine, the hydrokinetic torque-coupling device comprising:

a casing rotatable about a rotational axis and drivingly coupled to the electrical machine;

a torque converter including an impeller wheel and a turbine wheel disposed in the casing coaxially with the impeller wheel;

a lockup clutch including a dual piston assembly and being switchable between a hydrodynamic transmission mode, in which the turbine wheel is rotatable relative to the casing, and a lockup mode, in which the turbine wheel is non-rotatably coupled to the casing; and a selectable one-way clutch disposed outside of the casing, the selectable one-way clutch including an outer race, a plurality of pairs of torque transmitting elements each including first and second torque transmitting elements, an inner race drivingly and non-rotatably connectable to the outer race through the first and second torque transmitting elements, and a plurality of actuator members configured to circumferentially displace the first torque transmitting elements in each of the pairs of the torque transmitting elements;

each of the first and second torque transmitting elements of each of the pairs of the torque transmitting elements selectively circumferentially moveable relative to at least one of the outer race and the inner race between an engaged position, in which the outer race is non-rotatably coupled to the inner race of the selectable one-way clutch, and a disengaged position, in which the outer race is rotatable relative to the inner race of the selectable one-way clutch;

the dual piston assembly including a main piston and at least one secondary piston mounted to the main piston and axially moveable relative to the main piston and the casing;

the main piston of the dual piston assembly selectively axially moveable relative to the casing and the at least one secondary piston between a lockup position, in which the main piston is non-rotatably coupled to the casing, and a non-lockup position, in which the main piston is rotatable relative to the casing;

the at least one secondary piston having a plurality of actuator rods unitary with the at least one secondary piston;

the first torque transmitting elements of each of the pairs of the torque transmitting elements selectively circumferentially moveable from the engaged position to the disengaged position by axial movement of the actuator rods of the at least one second lockup piston acting to the actuator members;

the method comprising the step of selectively controlling axial displacement of the dual lockup piston assembly by regulating hydraulic pressure to the main piston and the at least one secondary piston in order to configure the first torque transmitting elements of the selectable one-way clutch in a desired one of the engaged position and the disengaged position.

23. A hybrid electric vehicle including an internal combustion engine, at least one rotary electric machine and a hydrokinetic torque-coupling device mechanically coupling the internal combustion engine and the at least one rotary electric machine, the hydrokinetic torque-coupling device comprising:

a casing rotatable about a rotational axis;

a torque converter including an impeller wheel and a turbine wheel disposed in the casing coaxially with the impeller wheel;

a lockup clutch including a dual piston assembly and being switchable between a hydrodynamic transmission mode, in which the turbine wheel is rotatable relative to the casing, and a lockup mode, in which the turbine wheel is non-rotatably coupled to the casing; and a selectable one-way clutch disposed outside of the casing, the selectable one-way clutch including an outer race, a plurality of pairs of torque transmitting elements each including first and second torque transmitting elements, an inner race drivingly and non-rotatably connectable to the outer race through the first and second torque transmitting elements, and a plurality of actuator members configured to circumferentially displace the first torque transmitting elements in each of the pairs of the torque transmitting elements;

each of the first and second torque transmitting elements of each of the pairs of the torque transmitting elements selectively circumferentially moveable relative to at least one of the outer race and the inner race between an engaged position, in which the outer race is non-rotatably coupled to the inner race of the selectable one-way clutch, and a disengaged position, in which the outer race is rotatable relative to the inner race of the selectable one-way clutch;

the dual piston assembly including a main piston and at least one secondary piston mounted to the main piston and axially moveable relative to the main piston and the casing;

the main piston of the dual piston assembly selectively axially moveable relative to the casing and the at least one secondary piston between a lockup position, in which the main piston is non-rotatably coupled to the casing, and a non-lockup position, in which the main piston is rotatable relative to the casing;

the at least one secondary piston having a plurality of actuator rods unitary with the at least one secondary piston;

the first torque transmitting elements of each of the pairs of the torque transmitting elements selectively circumferentially moveable from the engaged position to the disengaged position by axial movement of the actuator rods of the at least one second lockup piston acting to the actuator members.

24. A hybrid electric vehicle, comprising:

an internal combustion engine;

an electric machine;

ground engaging wheels;

a torque transmitting system operably associate with the internal combustion engine, the electric machine and the ground engaging wheels; and a hydrokinetic torque-coupling device of claim 1 operably associated with the torque transmitting system.

\* \* \* \* \*